(12) United States Patent
Hayashi et al.

(10) Patent No.: US 7,652,744 B2
(45) Date of Patent: Jan. 26, 2010

(54) OPTICAL ELEMENT, METHOD FOR MANUFACTURING OPTICAL ELEMENT, AND SEMI-TRANSMISSIVE SEMI-REFLECTIVE LIQUID CRYSTAL DISPLAY DEVICE

(75) Inventors: Shinji Hayashi, Saitama (JP); Norihisa Moriya, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 649 days.

(21) Appl. No.: 11/588,283

(22) Filed: Oct. 27, 2006

(65) Prior Publication Data

US 2007/0097313 A1    May 3, 2007

(30) Foreign Application Priority Data

Oct. 28, 2005   (JP) ............................. 2005-314693

(51) Int. Cl.
*C09K 19/02* (2006.01)
(52) U.S. Cl. ...................................... 349/168; 349/169
(58) Field of Classification Search ................. 349/168, 349/169
See application file for complete search history.

(56) References Cited

FOREIGN PATENT DOCUMENTS

| JP | A 8-278491 | 10/1996 |
|---|---|---|
| JP | A 2004-4494 | 1/2004 |
| JP | 2008242001 A | * 10/2008 |

* cited by examiner

*Primary Examiner*—David Nelms
*Assistant Examiner*—David Y Chung
(74) *Attorney, Agent, or Firm*—Oliff & Berridge, PLC

(57) ABSTRACT

The optical element in accordance with the present invention comprises a substrate having a light transmission ability and a fixed liquid crystal layer formed on the substrate. The fixed liquid crystal layer is composed of liquid crystal phase sections in which a liquid crystalline compound is fixed in a liquid crystal phase state and isotropic phase sections in which a liquid crystalline compound is fixed in an isotropic phase state.

The layer thickness of the liquid crystal phase sections is larger than that of the isotropic phase sections, and the liquid crystal phase sections are formed so as to protrude with respect to the isotropic phase sections.

16 Claims, 7 Drawing Sheets

OPTICAL ELEMENT, METHOD FOR
MANUFACTURING OPTICAL ELEMENT,
AND SEMI-TRANSMISSIVE
SEMI-REFLECTIVE LIQUID CRYSTAL
DISPLAY DEVICE

BACKGROUND OF THE INVENTION

1. Field of the Invention

The present invention relates to an optical element for imparting a phase difference (retardation) to the light transmitted therethrough and to a method for manufacturing same, and more particularly to an optical element to be incorporated in a semi-transmissive semi-reflective liquid crystal display device to provide a phase difference suitable for transmissive display or reflective display and to a method for manufacturing such optical element. Furthermore, the present invention also relates to a semi-transmissive semi-reflective liquid crystal display device incorporating such optical element.

2. Description of the Related Art

A liquid crystal display device has been suggested that combines the function of a reflective liquid crystal display device in which the light introduced into the liquid crystal display device from the outside (external light) is reflected by a reflection plate and passed through a liquid crystal layer, switching and displaying the bright-dark state of the screen (termed "reflective display"), and the function of a transmissive liquid crystal display device in which the light emitted from a light source that was installed in advance inside the liquid crystal display device passes through a liquid crystal layer and switches and displays the bright-dark state of the screen (termed "transmissive display"). In such semi-transmissive semi-reflective liquid crystal display device, transmissive display and reflective display are performed at the same time. When the environment is comparatively dark, mainly the transmissive display is viewed, and when the environment is bright, mainly the reflective display is viewed. Because such display devices can be used in a variety of stages, regardless of the ambient conditions, they have been widely employed in the field of mobile devices that are supposed to be used mainly outdoors in bright environment.

The following semi-transmissive semi-reflective liquid crystal display device can be considered. FIG. 7 shows an example of a semi-transmissive semi-reflective liquid crystal display device.

In a liquid crystal display device 100, a liquid crystal layer 103 is inserted between laminated members 151, 152 comprising glass substrates 101, 102, and light irradiation means 117 comprising a light source 122, a light guiding plate 123, and a light reflecting member 124 is disposed in a position on the outside of the outer side surface of the laminated member 152.

Reflecting plates 104a are disposed with a certain spacing at the inner side surface of the glass substrate 102, a protective layer 119 is provided between the inner side surface of the glass substrate and reflecting plates 104a, light transmitting sections 104b are formed between the adjacent reflecting plates 104a, and the light transmitting sections 104b and reflecting plates 104a constitute a semi-transmissive semi-reflective layer 104.

Here, in the laminated member 152, the region where the reflecting plates 104a are disposed corresponds to a reflective display region serving as a region for reflecting the light used when a bright-dark display is performed in the reflective display, and the region where the light transmitting sections are provided corresponds to a transmissive display region serving as a region that passes the light used when a bright-dart display is performed in the transmissive display. Furthermore, in the laminated member 151, on an interface with the liquid crystal layer 103, a reflective display region or transmissive display region is formed in a position facing, in the thickness direction of the laminated member 151, the light reflecting section 104a or light transmitting section 104b of the laminated member 152.

A transparent electrode 108 comprising a transparent electrically conductive film such as Indium Tin Oxide (hereinafter abbreviated to "ITO") is laminated on the inner surface side of the glass substrate 101, and an oriented film 107 is formed so as to cover the transparent electrode 108. A ¼ wavelength plate 120 and a polarization plate 114 are provided on the outer surface side of the glass substrate 101.

Transparent electrodes 112 comprising a transparent electrically conductive film such as ITO are formed on the inner surface of the glass substrate 102, and an oriented film 113 is formed so as to cover the transparent electrodes 112. A ¼ wavelength plate 115 and a polarization plate 116 are provided on the outer surface side of the glass substrate 102.

In the liquid crystal display device 100, the surface of the glass substrates 101, 102 that is closer to the liquid crystal layer 103 is taken as an inner side and the surface that is farther from the liquid crystal layer is taken as an outer side.

The ¼ wavelength plates 115, 120 generate a phase difference of ¼ wavelength with respect to the independent polarization components in the light that are mutually orthogonal (this phase difference will be hereinbelow termed "λ/4 phase difference"), whereby the linearly polarized light and circularly polarized light are mutually converted.

In the liquid crystal display device 100, the light passing through the space sandwiched by the reflective display regions formed on the laminated members 151, 152 is used for the reflective display, and the light passing through the space sandwiched by the transmissive display regions formed at the two substrates is used for the transmissive display.

The liquid crystal display device 100 freely forms a bright-dark state in response to voltage application to the liquid crystal layer 103. Thus, in the liquid crystal display device 100, if a state is formed (ON state) in which a voltage is applied to the liquid crystal layer 103 and a state is formed in which practically no phase difference occurs in the light passing through the liquid crystal layer 103, then a dark state is formed, and if a state is formed (OFF state) in which no voltage is applied to the liquid crystal layer 103 and a state is formed in which a phase difference occurs in the light passing through the liquid crystal layer 103, then a bright state is formed.

The liquid crystal display device 100 forms a dark state in the reflective display in the manner as follows.

In the reflective display, the light (external light) from the outside of the polarization plate 114 falls toward the inside of the liquid crystal display device, but if the external light propagates via the polarization plate 114 inward the liquid crystal display device, then, of this light, the linearly polarized light (termed "incident linearly polarized light") that is provided with a polarization axis parallel to the transmission axis of the polarization plate 114 is transmitted by the polarization plate 114 and propagates inwardly, and if this linearly polarized light further passes through the ¼ wavelength plate 120, then it becomes a circularly polarized light, and this circularly polarized light advances into the liquid crystal layer 103. Because no phase difference appears in the circularly polarized light when it passes through the liquid crystal layer 103, the circularly polarized light is transmitted via the liquid crystal layer 103, while maintaining the polarization state thereof.

The circularly polarized light that was transmitted via the liquid crystal layer 103 is reflected by the surface of the reflecting plate 104. At this time, the rotation direction of the circularly polarized light is reversed and it becomes an inversely rotated circularly polarized light and passes outwardly toward the ¼ wavelength plate 120 through the liquid crystal layer 103, while maintaining the polarization state thereof. If the circularly polarized light is transmitted through the ¼ wavelength plate 120, it becomes a linearly polarized light with a polarization axis perpendicular to that of the incident linearly polarized light. Here, because the polarization plate 114 has a transmission axis parallel to the polarization axis of the incident linearly polarized light, the linearly polarized light with a polarization axis perpendicular to that of the incident linearly polarized light is absorbed by the polarization plate 114 and practically no such light propagates to the outside. As a result, a person viewing the display sees practically no light. In other words, the liquid crystal display device performs the dark display.

The liquid crystal display device 100 forms a dark state in the transmissive display in the manner as follows.

In the transmissive display, the light from the light irradiation unit is introduced into the liquid crystal display device, but if the incident light propagates via the polarization plate 116 inward the liquid crystal display device, then, of this incident light, the linearly polarized light that is provided with a polarization axis parallel to the transmission axis of the polarization plate 116 is transmitted by the polarization plate 116 and propagates inwardly toward the ¼ wavelength plate 115. If this linearly polarized light further passes through the ¼ wavelength plate 115, then it becomes a circularly polarized light. Here, the polarization plate 116 and polarization plate 114 are disposed according to a cross Nicol's configuration, and the linearly polarized light obtained after passing through the polarization plate 116 becomes the linearly polarized light that has a polarization axis perpendicular to the incident linearly polarized light. Therefore, the circularly polarized light formed when the light passes through the ¼ wavelength plate 115 has the same rotation direction as the circularly polarized light formed by reflection at the surface of the reflecting plate 104 in the reflective display.

Therefore, the circularly polarized light formed by passing through the ¼ wavelength plate 115 propagates from the light transmitting unit via the liquid crystal layer 103 outwardly toward the ¼ wavelength 120. In the course of this propagation, the polarization state of light changes in the same manner as was explained with reference to the reflective display and eventually the light is absorbed by the polarization plate 114 and practically no light propagates to the outside. A person viewing the display sees practically no light from the light irradiation unit. In other words, the liquid crystal display device performs the dark display.

The liquid crystal display device 100 forms a bright state in the reflective display in the manner as follows.

From the introduction of the external light from the outside to the propagation to the liquid crystal layer, the light is transmitted, becomes a circularly polarized light, and propagates to the liquid crystal layer 103 in the same manner as in the formation of the dark state in the reflective display. With respect to the portions of the liquid crystal layer 103 through which the light is transmitted during the reflective display, settings for the liquid crystal layer 103 are made in advance such that when no voltage is applied to the liquid crystal layer, a ¼ wavelength phase difference is generated with respect to the light transmitted through the liquid crystal layer. Therefore, when the circularly polarized light propagating to the liquid crystal layer 103 is transmitted through the liquid crystal layer 103, the light becomes a linearly polarized light. Therefore, even if this light is reflected by the reflecting plate 104, it becomes a linearly polarized light with a polarization axis identical to that of this linearly polarized light. Furthermore, the linearly polarized light formed by reflection at the reflecting plate 104, propagates through the liquid crystal layer 103 outwardly toward the ¼ wavelength plate 120, is transmitted via the ¼ wavelength plate 120, and becomes a linearly polarized light having a polarization axis parallel to the transmission axis of the polarization plate 114. Further, this linearly polarized light passes through the polarization plate 114 and propagates outwardly. A person viewing the display sees the light, and the liquid crystal display device performs the bright display.

The liquid crystal display device 100 forms a bright state in the transmissive display in the manner as follows.

From the introduction of the light from the light irradiation unit to the propagation to the liquid crystal layer, the light is transmitted, becomes a circularly polarized light, and propagates to the liquid crystal layer 103 in the same manner as in the formation of the dark state in the transmissive display. With respect to the portion of the liquid crystal layer 103 through which the light is transmitted during the transmissive display, settings for the liquid crystal layer 103 are made in advance such that when no voltage is applied to the liquid crystal layer, a ½ wavelength phase difference is generated with respect to the light transmitted through the liquid crystal layer. Therefore, when the circularly polarized light propagating to the liquid crystal layer 103 is transmitted through the liquid crystal layer 103, the light becomes a circularly polarized light with reversed direction of rotation, and when this light is further transmitted through the ¼ wavelength plate 120, the light becomes a linearly polarized light having a polarization axis parallel to the transmission axis of the polarization plate 114. This linearly polarized light passes through the polarization plate 114 and propagates to the outside. Thus, a person viewing the display sees the light, and the liquid crystal display device performs the bright display.

In such liquid crystal display device 100, of the light (circularly polarized light) that is irradiated from the light irradiation unit and transmitted through the ¼ wavelength plate 115, the light that is reflected by the reflecting plate 104 and propagates outwardly toward the ¼ wavelength plate 115 is a circularly polarized light that has a rotation direction inverted with respect to that of the circularly polarized light directed inward of the liquid crystal display device, and if this light is transmitted outwardly via the ¼ wavelength plate 115, it becomes a linearly polarized light with a polarization axis perpendicular to the transmission axis of the polarization plate 116. Thus, eventually in the liquid crystal display device 100, the light reflected by the reflecting plate 4 is almost completely absorbed by the polarization plate 116, and the light from the light irradiation unit cannot be used effectively. The resultant problem is that the light utilization efficiency is decreased.

Accordingly, Japanese Patent Application Laid-open No. 2004-004494 suggested a semi-transmissive reflective liquid crystal display device in which a liquid crystal layer is sandwiched between mutually opposing upper substrate and lower substrate and a transmissive display region and a reflective display region are contained within one dot region, wherein an upper polarization plate is provided on the outer surface side of the upper substrate, a lower polarization plate is provided on the outer surface side of the lower substrate, a reflecting layer and a phase different layer are provided successively from the substrate side on the reflective display region on the inner surface side of the lower substrate, and when a selected voltage is applied or when a non-selected voltage is applied, the phase difference of the liquid crystal layer in the transmissive display region is larger than the phase difference of the liquid crystal layer in the reflective display region.

In this liquid crystal display device, laminating a phase difference layer that causes a ¼ wavelength (λ/4) only on the reflecting layer makes it possible to use the light efficiently and to improve the performance of the transmissive display.

However, the liquid crystal display device of Japanese Patent Application Laid-open No. 2004-004494 is manufactured by a process comprising the steps of using a photolithography method for patterning the phase difference layer on the substrate surface, laminating a photosensitive resin layer on a polymer liquid crystal layer, patterning the photosensitive resin layer, etching the polymer liquid crystal layer by using the patterned photosensitive resin layer as a mask, and leaving locally the polymer liquid crystal layer. Thus, the steps of forming and etching the photosensitive resin layer are required in the manufacture of the liquid crystal display device and the manufacturing process is complex.

At object of the present invention is to resolve the above-described problems and to provide an optical element that can be easily manufactured and can cause a phase difference in a desired position and also a method for manufacturing the optical element.

Another object of the present invention is to provide a semi-transmissive semi-reflective liquid crystal display device incorporating such optical element.

SUMMARY OF THE INVENTION

The present invention provides an optical element comprising: a substrate having a light transmission ability; and a fixed liquid crystal layer formed on the substrate, wherein the fixed liquid crystal layer comprises: liquid crystal phase sections in which a liquid crystalline compound is fixed in a liquid crystal phase state; and isotropic phase sections in which a liquid crystalline compound is fixed in an isotropic phase state, and wherein a layer thickness of the liquid crystal phase sections is larger than the layer thickness of the isotropic phase sections.

The liquid crystal phase sections and isotropic phase sections are provided adjacently to each other, and a plurality of each section are formed with the prescribed pattern.

The liquid crystal phase sections preferably have a phase difference of λ/4.

A thermotropic liquid crystal polymerizable under ultraviolet radiation can be used as the liquid crystalline compound.

A layer constituting a switching circuit is laminated on the substrate.

A plurality of light reflecting sections are provided with the predetermined pattern on the substrate and the liquid crystal phase section is provided on each light reflecting section.

A color layer is formed on the substrate, and the liquid crystal phase sections and isotropic phase sections are formed on the substrate via the color layer.

An oriented film is provided on the substrate, and the fixed liquid crystal layer is provided on the substrate via the oriented film.

The method for manufacturing an optical element in accordance with the present invention comprises:

a coated film formation step of forming a coated film by coating a liquid crystal composition comprising a liquid-crystalline compound on a substrate;

a liquid crystal phase formation step of orienting the liquid crystalline compound in the coated film in the state of a liquid crystal phase;

a liquid crystal phase section formation step of irradiating the liquid crystalline compound that has been oriented in the state of a liquid crystal phase with light, and selectively forming the liquid crystal phase sections in which the liquid crystalline compound is polymerized and fixed in a liquid crystal phase state; and an isotropic phase section formation step of fixing the liquid crystalline compound that has not been fixed in the liquid crystal phase section formation step in an isotropic phase state and forming the isotropic phase sections.

Ultraviolet radiation can be used as the light for irradiating the liquid crystalline compound.

The isotropic phase sections can be formed in the isotropic phase section formation step by heating the liquid-crystalline compound to an isotropic phase transition temperature or to a higher temperature, performing irradiation with ultraviolet radiation, polymerizing and fixing the liquid crystalline compound in an isotropic phase state.

A liquid crystal phase section protrusion height indicating the difference between the layer thickness of the liquid crystal phase sections and the layer thickness of the isotropic phase sections can be controlled by regulating the irradiation dose of the ultraviolet radiation in the liquid crystal phase section formation step.

The semi-transmissive semi-reflective liquid crystal display device in accordance with the present invention comprises laminated members comprising a substrate and a material layer other than the substrate, a drive liquid crystal layer formed between two laminated members arranged opposite each other, a plurality of light reflecting sections formed with the predetermined pattern at any one laminated member from among the two laminated members, a plurality of light transmitting sections formed adjacently to the light reflecting sections, reflective display regions performing the reflection of light by the light reflecting regions, transmissive display regions performing the transmission of light by the light transmitting regions, and an optical element included in any one laminated member from among the two laminated members.

The optical element, as described hereinabove, has a substrate having a light transmission ability and a plurality of liquid crystal phase sections and isotropic phase sections formed according to the predetermined pattern on the substrate, wherein the layer thickness of the liquid crystal phase sections is larger than the layer thickness of the isotropic phase sections.

The semi-transmissive semi-reflective liquid crystal display device in accordance with the present invention is configured by providing the liquid crystal phase sections of the optical element in the positions corresponding to the reflective display regions and positioning the isotropic phase sections in the positions corresponding to transmissive display regions.

In the semi-transmissive semi-reflective liquid crystal display device in accordance with the present invention, the liquid crystal phase section protrusion height that is necessary to generate λ/4 phase difference between the light passing through the transmissive display regions and the light passing through the reflective display regions in the drive liquid crystal layer serves as the liquid crystal phase section protrusion height indicating the difference between the layer thickness of the liquid crystal phase sections and the layer thickness of the isotropic phase sections.

With the optical element in accordance with the present invention, it is possible to generate a phase difference between the light prior to passing through the optical element and the light that was transmitted through the optical element in the liquid crystal phase sections and to generate practically no phase difference between the light prior to passing through the optical element and the light that was transmitted through the optical element in the isotropic phase sections. Furthermore, with such optical element, the isotropic phase sections that have liquid crystals of isotropic phase and liquid crystal phase sections that have liquid crystals of liquid crystal phase and are adjacent to the isotropic phase sections are formed and zones where the phase difference is generated according to a predetermined pattern and zones where no phase difference is generated can be formed according to the transmission positions of the light irradiated on the optical element.

In the optical element in accordance with the present invention, the isotropic phase sections are formed adjacently to the liquid crystal layer zones, and the isotropic phase sections are formed so as to surround the side circumferential surfaces of the liquid crystal phase sections. Therefore, the isotropic phase sections can be adjacent to part of the side circumferential surface of the liquid crystal phase sections, whereby the structure of the liquid crystal phase sections can be reinforced and the risk of the liquid crystal phase sections being damaged is reduced. Furthermore, the isotropic phase sections can be formed in the positions where pixel sections in the transmissive display (termed "pixel sections for transmissive display") are configured and the isotropic phase sections function as a protective film for the pixel sections for transmissive display, whereby the risk of the pixel sections for transmissive display being damaged can be reduced.

With the optical element in accordance with the present invention, the fixed liquid crystal layer may be formed by crosslinking polymerization of thermotropic liquid crystals that can be polymerized under irradiation with ultraviolet radiation. In this case, the orientation ability of liquid crystals of the liquid crystal phase sections formed in the fixed liquid crystal layer is hardly affected by heat, and the optical element can be used even in optical devices such as liquid crystal display devices employed in the environment that can be easily heated to a comparatively high temperature, for example, in vehicles.

With the method for manufacturing the optical element in accordance with the present invention, the optical element can be obtained by coating a liquid crystalline compound on a substrate, covering the compound with a photomask, forming liquid crystal phase sections by irradiation with ultraviolet radiation, and then heating to form isotropic phase sections, wherein the optical element is configured so that the layer thickness of the liquid crystal phase sections is larger than that of the isotropic phase sections. Therefore, a structure in which liquid crystal phase sections protrude beyond the isotropic phase sections can be obtained without a complex process such as dry etching. Moreover, the protrusion height of the liquid crystal phase sections above the isotropic phase sections (liquid crystal phase section protrusion height) can be adjusted. Therefore, with such manufacturing method, the optical element can be manufactured by a comparatively simple process and the production cost is readily reduced.

The fixed liquid crystal layer in the optical element in accordance with the present invention may be laminated on a substrate having a color layer formed thereof. Furthermore, a fixed liquid crystal layer may be formed such that a reflecting layer that reflects light is locally provided on the substrate and the liquid crystal phase sections are formed on the reflecting layer. Therefore, the optical element can be incorporated into a liquid crystal display device by laminating the fixed liquid crystal layer integrally on members constituting the liquid crystal display device. Moreover, manufacturing the optical element as a separate member and then attaching it eliminates the necessity of providing the optical element in the prescribed location in the liquid crystal display device and can make contribution to reducing the thickness of the liquid crystal display device.

In the semi-transmissive semi-reflective liquid crystal display device incorporating the optical element in accordance with the present invention, the liquid crystal phase sections are arranged in the reflective display regions and the isotropic phase sections are arranged in the transmissive display regions. Furthermore, because the optical element can be manufactured by randomly adjusting the thickness of the liquid crystal phase sections, the liquid crystal display device can incorporate an optical element so adjusted that a phase difference of ¼ wavelength is generated in the light transmitted through the liquid crystal phase section.

With the liquid crystal display device incorporating the optical element, the layer thickness of the liquid crystal phase sections is larger than the layer thickness of the isotropic phase sections, and the liquid crystal phase section protrusion height representing the difference between the two thicknesses can be easily regulated. Therefore, the thickness of liquid crystal layer of the liquid crystal display device can be regulated so that a phase difference of ¼ wavelength is generated in the light transmitted through a portion sandwiched by the reflective display regions formed on the opposing laminated members and that a phase difference of ½ wavelength is generated in the light transmitted through a portion sandwiched between the transmissive display regions formed on the opposing substrates.

Therefore, with such liquid crystal display device, a ¼ wavelength plate that has been provided to perform the reflective display can be omitted. Moreover, when a transmissive display was performed in the conventional devices, because light was transmitted through a ¼ wavelength plate provided at one laminated member to perform the reflective display, a ¼ wavelength pale was also provided on the other laminated member. This ¼ wavelength plate can be also omitted.

Thus, in the liquid crystal display device incorporating the optical element in accordance with the present invention, the device configuration can be simplified and the thickness of the liquid crystal display device can be further decreased.

In addition, with the liquid crystal display device in accordance with the present invention, when transmissive display is performed, it is not necessary that the light from the light source irradiated toward the liquid crystal layer be transmitted through the ¼ wavelength plate. Therefore, the above-described problem associated with the decrease in the light utilization efficiency can be resolved.

DESCRIPTION OF THE PREFERRED EMBODIMENTS

A first embodiment of the optical element in accordance with the present invention will be described hereinbelow in greater detail.

Figure 1:
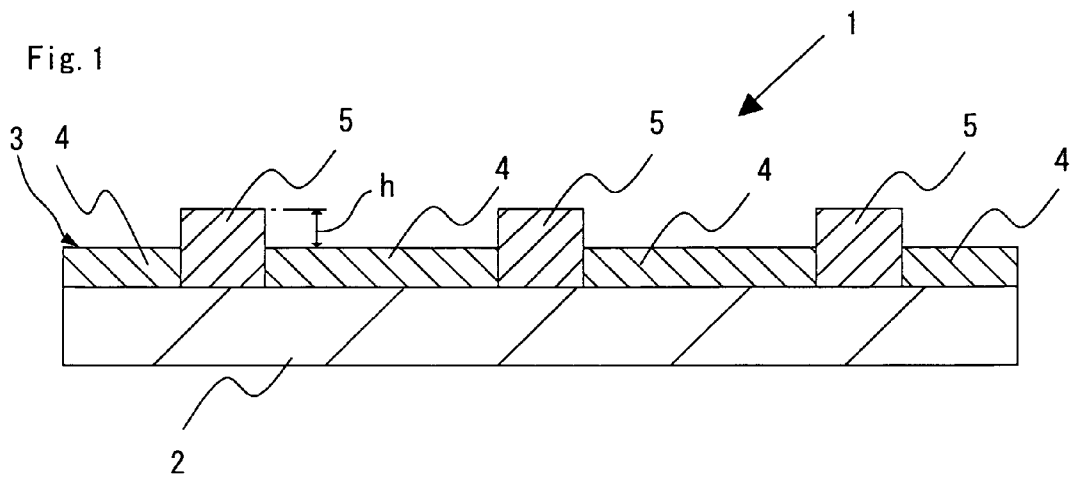
FIG. 1 is a cross-sectional simplified view illustrating an optical element in accordance with the present invention.

FIG. 1 is a schematic drawing illustrating the cross-sectional structure of the optical element in accordance with the present invention.

In an optical element 1, a fixed liquid crystal layer 3 comprising a liquid crystalline compound is formed on the surface of a substrate 2.

Figure 2A:
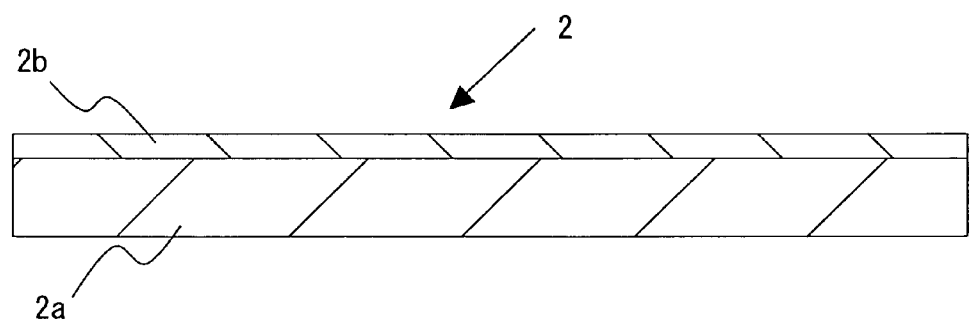
FIG. 2A is a cross-sectional simplified view illustrating an optical element comprising a functional layer on a substrate.
Figure 2B:
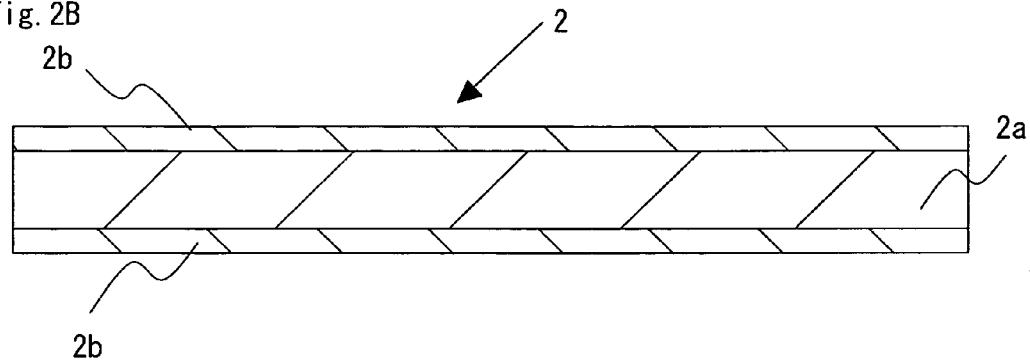
FIG. 2B is a cross-sectional simplified view illustrating another embodiment of the optical element comprising a functional layer on a substrate.

The substrate 2 is from a material having light transmission ability. The substrate 2 may have a single-layer configuration or may be a multilayer structure obtained a laminating a plurality of layers. As shown in FIGS. 2A, 2B, the substrate 2 may be configured by laminating a functional layer 2b having a predetermined function on a substrate main section 2a having light transmission ability. The functional layer 2b may be formed only on one surface of the substrate main section 2a or on both surfaces thereof. The functional layer 2b may be also formed inside the substrate main section 2a.

An appropriate optical transmittance of the substrate 2 or the substrate main section 2a can be selected. A light-shielding region may be locally provided on the substrate 2 or the substrate main section 2a.

A glass substrate and other plate-like bodies from various materials can be appropriately used as the substrate 2 or the substrate main section 2a. More specifically, for example, a member having no flexibility (rigid material) such as quartz glass, borosilicate glass, or synthetic quartz glass, and a member having flexibility (flexible member) such as a resin film or a resin sheet can be used.

Furthermore, when the optical element 1 is used in a liquid crystal display device, it is preferred that the substrate 2 or the substrate main section 2a be an alkali-free glass.

When the substrate 2 or the substrate base section 2a is a member using a resin, such as a resin film or a resin sheet, the following specific resins can be employed for the substrate 2 or the substrate base section 2a: polyester polymers such as polycarbonate polymers, polyacrylates, or polyethylene terephthalate (PET), polyimide polymers such as a polyimides or polyamidoimides, polysulfone polymers, polyethersulfone polymers, polystyrene polymers, polyolefin polymers such as polyethylene or polypropylene, polyether ketone polymers, polyvinyl alcohol polymers, cellulose acetate polymers, polyvinyl chloride polymers, polymethyl methacrylate polymers and other thermoplastic polymers, triacetyl cellulose (TAC) film, liquid-crystalline polymer and the like.

A uniaxially stretched or biaxially stretched resin film comprising the above-described resin may be used in the substrate base section 2a.

In this case, using a film comprising polyethylene terephthalate as the resin film is preferred from the standpoint of a range width of stretching ratio and availability.

The functional layer 2b has a function of changing the state of light and differs in configuration from the fixed liquid crystal layer. Specific examples of the functional layer include a color layer, a layer comprising a cholesteric liquid crystal with fixed orientation of liquid crystal, a reflecting plate that reflects light, and a polarization plate. Furthermore, the functional layer 2b may be provided not only on the main surface of the substrate base section 2a, but also locally on the surface of the substrate base section 2a.

The functional layer 2b may also be an oriented film such as a horizontally oriented film in which a liquid crystalline compound is oriented horizontally or a vertically oriented film in which a liquid crystalline compound is oriented vertically.

A polyimide, a polyamide, or poly(vinyl alcohol) is usually used as the oriented film. Using a polyimide having a long-chain alkyl group as the oriented film is preferred because the thickness of the fixed liquid crystal layer 3 formed in the optical element can be selected within a wide range.

The oriented film can be formed by adjusting the composition of a film composition liquid constituting the film, forming a coated film by coating the film composition liquid on the substrate surface by flexo printing or spin coating, and then curing the coated film. Specific examples of polyimide-containing compositions that can be used as the film composition liquid include SE-7511 or SE-1211 manufactured by Nissan Chemical Co., Ltd., JALS-2021-R2 manufactured by JSR Co., Ltd., QL and LX series manufactured by Hitachi Chemical—Du Pont Microsystems Co., Ltd., or LIXON Aligner manufactured by Chisso Co., Ltd.

The oriented film preferably has a thickness within a range of 0.01 to 1 μm. If the thickness of the oriented film is less than 0.01 μm, it is difficult to impart the desired orientation to the liquid crystals contained in the liquid crystal phase section of the fixed liquid crystal layer. Furthermore, if the thickness of the oriented film is more than 1 μm, the oriented film itself will scatter reflect the light and the optical transmittance of the optical element will be greatly decreased.

The fixed liquid crystal layer 3 comprises isotropic phase sections 4 comprising a liquid crystal of an isotropic phase and liquid crystal phase sections 5 comprising a liquid crystal of a liquid crystal phase. The liquid crystal phase sections 5 are adjacent to the isotropic phase sections 4 and are formed to protrude in the thickness direction of the fixed liquid crystal layer 3 with respect to the isotropic phase sections 4 continuously adjacent to this liquid crystal phase sections 5. Thus, the layer thickness of the liquid crystal phase sections is larger than the layer thickness of the isotropic phase sections. Here, the liquid crystal phase means a state in which the liquid crystal forms a liquid crystal structure and demonstrates liquid crystallinity, and the isotropic phase means a state in which the liquid crystal does not form a liquid crystal structure and demonstrates isotropic properties.

The thickness of the isotropic phase sections 4 is preferably 0.1 to 1.0 μm, and the thickness of the liquid crystal phase sections 5 is preferably 2.0 to 3.5 μm. Therefore, the liquid crystal phase sections 5 preferably protrude by about 1.0 to 3.4 μm with respect to the isotropic phase sections 4. If the protrusion of the liquid crystal phase sections 5 is too large and exceeds 3.4 μm, the optical element 1 is difficult to arrange on the liquid crystal display device. Furthermore, when the optical element 1 is arranged on a semi-transmissive semi-reflective liquid crystal display device, the liquid crystal phase sections 5 have to protrude to a degree generating a phase difference of ¼ wavelength in the light falling on the optical element 1, as compared with the isotropic phase section 4. Therefore, it is preferred that a protrusion of the liquid crystal phase sections 5 of about 1.0 μm be ensured.

The thickness of each component in the optical element 1 can be measured by using a probe-type step meter, and a commercial measurement device such as DEKTAK (manufactured by Sloan Co.) can be advantageously used.

In the fixed liquid crystal layer 3, liquid crystal having a slightly elongated molecular shape is fixed in a liquid crystal state, such a nematic liquid crystal state or smectic liquid crystal state, in the liquid crystal phase sections 5, and liquid crystal is fixed in an isotropic phase state in the isotropic phase sections 4.

In the fixed liquid crystal layer 3, the birefringence index Δn of the liquid crystal phase sections 5 is preferably about 0.03 to 0.20, more preferably about 0.05 to 0.15.

The liquid crystal phase sections 5 of the fixed liquid crystal layer 3 generate a phase difference between the light that falls on the liquid crystal phase sections 5 and the light that passed through the liquid crystal phase section 5, and this phase difference is determined by a retardation quantity, that is, a product of the birefringence index (Δn) and the thickness of the liquid crystal phase sections 5. Therefore, in order to obtain the desired phase difference, the retardation quantity corresponding thereto has to be obtained. If Δn is equal to or less than 0.03, the thickness has to be increased in order to obtain the desired retardation quantity, and the orientation ability of the liquid crystals constituting the liquid crystal phase section 5 deteriorates. On the other hand, if Δn exceeds 0.20, the thickness of the liquid crystal phase sections 5 has to be made extremely small and the thickness is difficult to control.

The birefringence index (Δn) indicates the difference between the refractive index $n_x$ in the X direction and refractive index $n_y$ in the Y axis direction, where the X axis is assumed to be at a right angle to the orientation direction of liquid crystal molecules in the plane parallel to the orientation direction of fine elongated liquid crystal molecules and the Y axis is assumed to be parallel to the orientation direction of the liquid crystal molecules. Thus, $\Delta n = |n_x - n_y|$.

The birefringence index can be calculated by measuring the retardation value and the thickness of the optical element 1.

The retardation value can be measured by using a commercial measurement device such as RETS-1250VA (manufactured by Otsuka Electronics Co., Ltd.) or KOBRA-21 (manufactured by Oji Scientific Instruments Co., Ltd.). The measurement wavelength is preferably the visible range (380 to 780 nm). It is especially preferred that measurements be conducted close to 550 nm where the specific eye sensitivity is the highest.

In the fixed liquid crystal layer 3, a polymerized structure (crosslinked polymer structure) is formed by crosslinking a liquid crystalline compound.

In the liquid crystal phase sections 5 of the fixed liquid crystal layer 3, the degree of crosslinking of liquid crystals is preferably about 70% or higher, more preferably about 90% or higher. If the degree of crosslinking of liquid crystals is less than 70%, a uniform orientation ability cannot be sufficiently maintained.

In the isotropic phase sections 4, the degree of crosslinking of liquid crystals is preferably about 70% or higher, more preferably about 90% or higher. If this degree of crosslinking is more than 70%, the isotropic phase sections 4 assume a strength such that the role thereof as a protective layer cannot be sufficiently demonstrated.

Any compound that can be fixed in the liquid crystal phase state may be used as the liquid crystalline compound constituting the liquid crystal phase sections 5, and the compound having properties such that a nematic liquid crystal is formed in the liquid crystal phase state is preferred because orientation ability can be easily imparted to such liquid crystalline compound.

It is preferred that a compound that can be fixed by polymerization of a liquid crystalline compound and that is a liquid crystal having a polymerizable group in the molecular structure thereof (sometimes referred to as a polymerizable liquid crystal) is preferred and a compound that can be three-dimensionally crosslinked in a liquid crystal state and has two or more polymerizable groups present therein is more preferred as the liquid crystal.

Monomers, oligomers, and polymers of polymerizable liquid crystals may be used as the polymerizable liquid crystal and appropriate combinations thereof may be also used.

Specific examples of such liquid crystalline compounds (Monomers of polymerizable liquid crystals) are represented by (1) to (13) below. A plurality of types of the compounds represented by (1) to (13) may be selected as the liquid crystalline compounds constituting the fixed liquid crystal layer 3.

(1)

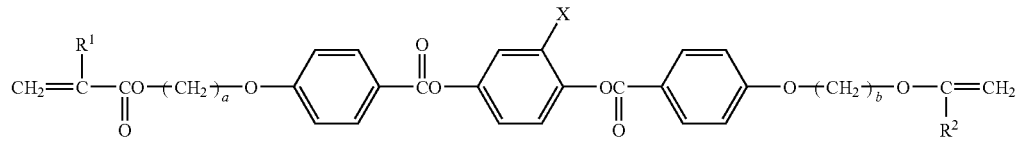

(wherein, $R^1$ and $R^2$ each represent hydrogen or a methyl group, X is hydrogen, chlorine, bromine, iodine, an alkyl group having 1 to 4 carbon atoms, a methoxy group, a cyano group, or a nitro group, a and b represent independently integers of 2 to 12).

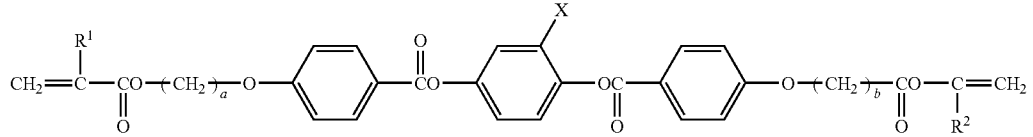
(2)
(wherein, $R^1$ and $R^2$ each represent hydrogen or a methyl group, X is hydrogen, chlorine, bromine, iodine, an alkyl group having 1 to 4 carbon atoms, a methoxy group, a cyano group, or a nitro group, a and b represent independently integers of 2 to 12).
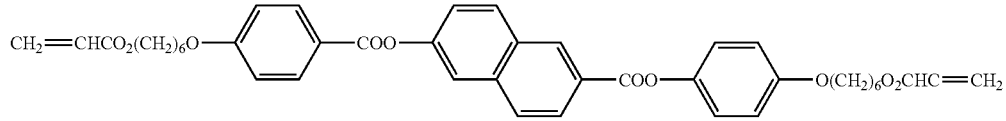
(3)
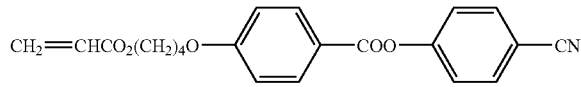
(4)
(5)
(6)
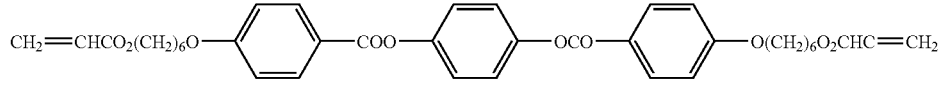
(7)
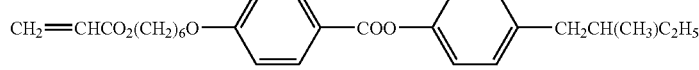
(8)
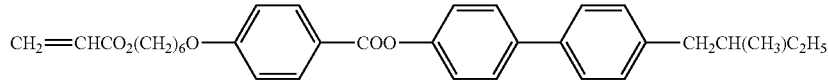
(9)
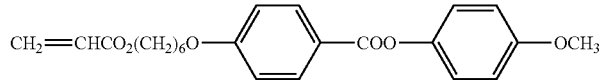
(10)
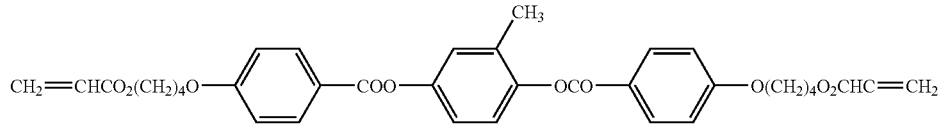
(11)
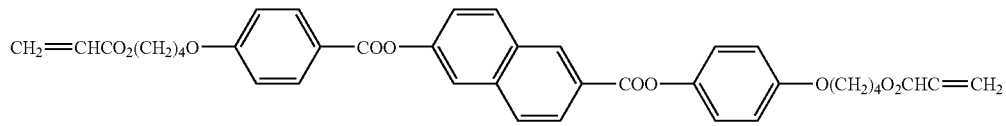
(12)

-continued

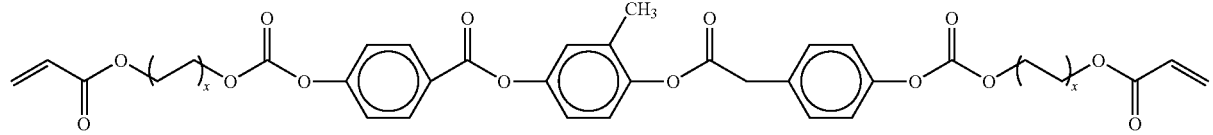

(13)

(Here, X is integer from 2 to 5.)

In the compound represented by the above (1) and (2), from the standpoint of the width of the temperature range where the liquid crystal demonstrates a liquid crystal phase, it is preferred that both the $R^1$ and the $R^2$ be hydrogen. Furthermore, it is preferred that X be chlorine or a methyl group. If the "a" and "b", which represent the chain lengths of the alkylene groups, are each less than 2, they lack stability as a liquid crystal. Further, if the "a" and "b" are each 13 or more, the isotropic transition temperature (isotropic phase transition temperature) is low. For this reason, the "a" and "b" are within a range of 2 to 12. It is even more preferred that they be integers each within a range of 4 to 10, still more preferably integers within a range of 6 to 9.

The fixed liquid crystal layer 3 may be formed by using a commercial material, for example, RMM 34 (manufactured by Merck Co., Ltd.).

In the optical element 1, the regions on the substrate 2 where the liquid crystal phase sections 5 are laminated serve as the reflective display regions, and the regions on the substrate 2 where the isotropic phase sections 4 are laminated serve as the transmissive display regions. The reflective display regions on the substrate 2 indicate the regions on the substrate 2 where the light falling on the liquid crystal display device is transmitted or reflected when a reflective display is performed in the case where the optical element 1 is incorporated in a semi-transmissive semi-reflective liquid crystal display device, and the transmissive display regions on the substrate 2 indicate the regions on the substrate 2 where the light falling on the liquid crystal display device is transmitted when a transmissive display is performed in the case where the optical element 1 is incorporated in a semi-transmissive semi-reflective liquid crystal display device.

In the optical element 1 in accordance with the present invention, the phase difference generated in the light transmitted therethrough differs depending on whether the light is transmitted via the liquid crystal phase sections 5 or isotropic phase sections 4.

Furthermore, because the fixed liquid crystal layer 3 in the optical element 1 has a crosslinked structure, the liquid crystal phase sections 5 are hardly affected by heat.

A method for manufacturing the optical element 1 in accordance with the present invention will be described below in greater detail.

The optical element 1 in accordance with the present invention can be manufactured in the manner as follows.

First, the substrate 2 for laminating the fixed liquid crystal layer 3 is prepared. When the substrate main section 2a is composed of a resin such as a resin film or a resin sheet, the substrate main section 2a is used to which orientation ability was imparted in advance. Furthermore, a substrate may be subjected to treatment further facilitating the orientation of liquid crystals (orientation facilitating process) according to the type of the liquid crystal contained in the fixed liquid crystal layer 3 formed on the surface of the substrate 2 or the orientation ability that is to be imparted to the liquid crystal, and the substrate obtained by the orientation facilitating process may be used as the substrate main section 2a.

When the substrate 2 is composed of the substrate main section 2a that was thus provided with orientation ability, for example, a uniaxially stretched film or a biaxially stretched film can be used as the substrate main section 2a. The substrate main section 2a to which orientation ability was imparted by irradiating with polarized light by using an optically oriented film can be also used.

A substrate to which orientation ability was imparted by forming an oriented film on the substrate main section 2a can be also used as the substrate 2. The advantage of the substrate 2 having an oriented film formed on the substrate main section 2a is that the orientation direction can be selected within a comparatively wide range by selecting the material of the oriented film.

The orientation facilitating process is carried out appropriately according to the type or orientation ability of liquid crystals contained in the liquid crystal phase sections 5. For example, when the liquid crystal contained in the liquid crystal phase sections 5 of the fixed liquid crystal layer 3 to be formed on the surface of substrate 2 is a nematic liquid crystal, the orientation facilitating process can be carried out in the manner as follows.

An oriented film is laminated on the substrate main section 2a, and the substrate 2 provided with orientation ability is obtained by rubbing the oriented film. A method by which a rubbing cloth selected from such materials as rayon, cotton, polyamide, and poly(methyl methacrylate) is wound around a metal roll and the roll is brought into contact with the film and rotated, or the roll is fixed and the substrate film is conveyed, thereby causing friction on the film surface by rubbing is usually used for rubbing.

When the water repellency or oil repellency of the oriented film surface is high, then the wetting ability of the oriented film surface may be increased in advance by performing UV washing or plasma treatment within a range in which the liquid crystals can be oriented.

A liquid crystal composition is then prepared by dispersing in a solvent the liquid crystal that will constitute the fixed liquid crystal layer 3 to be laminated on the substrate 2. A coated film is formed by coating the liquid crystal composition on the substrate 2 (coated film formation process).

In the coated film formation process, a publicly known coating method can be used for coating the liquid crystal composition. More specifically, the coating liquid can be coated on the substrate 2 by a spin coating method, a die coating method, a slit coating method, a roll coating method, a gravure coating method, a slide coating method, or an immersion coating method, or by a method that is an appropriate combination thereof. An adhesive layer may be provided on the substrate 2 and the liquid crystal composition may be coated on top of the adhesive layer, as described in Japanese Patent Application Laid-open No. 08-278491, to improve adhesion between the substrate 2 and coated film.

The weight ratio of the liquid crystal in the liquid crystal composition is 5 wt. % to 50 wt. %. When this weight ratio is more than 50 wt. %, the thickness distribution of the fixed liquid crystal layer can increase, and when the weight ratio is less than 5 wt. %, the coating can be nonuniform. Accordingly, the weight ratio of the liquid crystal is preferably 5 wt. % to 50 wt. %, more preferably 10 wt. % to 30 wt. %.

No specific limitation is placed on the solvent, provided that it can dissolve polymerizable liquid crystals, and an organic solvent can be appropriately selected. When a spin coating method is used for forming the coated film by coating the liquid crystal composition on the substrate 2, 3-methoxybutyl acetate, diethylene glycol dimethyl ether, propylene glycol monomethyl ether acetate, and cyclohexanone are preferably used as the solvent.

A photopolymerization initiator is preferably added to the liquid crystal composition.

A radical polymerizable initiator can be advantageously used as the photopolymerization initiator. Radical polymerizable initiators generate free radicals under the effect of energy such as ultraviolet radiation. Examples of suitable radical polymerizable initiators include benzyl (also referred to as bibenzoyl), benzoin isobutyl ether, benzoin isopropyl ether, benzophenone, benzoylbenzoic acid, methyl benzoylbenzoate, 4-benzoyl-4'-methyldiphenyl sulfide, benzyl methyl ketal, dimethyl aminomethyl benzoate, 2-n-butoxyethyl-4-dimethylaminobenzoate, isoamyl p-dimethylaminobenzoate, 3,3'-dimethyl-4-methoxybenzophenone, methylbenzoyl formate, 2-methyl-1-(4-(methylthio)phenyl)-2-morpholinopropane-1-one, 2-benzyl-2-dimethylamino-1-(4-morpholinophenyl)-butane-1-one, 1-(4-dodecylphenyl)-2-hydroxy-2-methylpropane-1-one, 1-hydroxycyclohexyl phenyl ketone, 2-hydroxy-2-methyl-1-phenylpropane-1-one, 1-(4-isopropylphenyl)-2-hydroxy-2-methylpropane-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. In accordance with the present invention, commercial photopolymerization initiators also can be appropriately used. For example, ketone compounds "Irgacure 184 (substance name: 1-hydroxycyclohexyl phenyl ketone)", "Irgacure 369 (substance name: 2-benzyl-2-dimethylamino-1-(4-morpholinophenyl)-butane-1-one)","Irgacure 651 (substance name: 2,2-dimethoxy-1,2-diphenylethane-1-one)", "Irgacure 907 (substance name: 2-methyl-1-(4-(methylthio)phenyl)-2-morpholinopropane-1-one)" and "Darocure 1173 (substance name: 2-hydroxy-2-methyl-1-phenylpropane-1-one)" manufactured by Ciba Specialty Chemicals Co., Ltd. or buimidazole compounds such as 2,2'-bis(o-chlorophenyl)-4,5,4'-tetraphenyl-1,2'-biimidazole (manufactured by Kurogane Kasei Co., Ltd.) may be used.

The photopolymerization initiator is preferably added within a range in which the liquid crystal regularity of the polymerizable liquid crystal is not significantly degraded. The photopolymerization initiator can be added to the polymerizable liquid crystal material generally in an amount within a range 0.01 to 15 wt. %, preferably 0.1 to 12 wt. %, more preferably 0.5 to 10 wt. %.

In addition to the photopolymerization initiator, a sensitizer can be added to the liquid crystal composition, within a range in which the object of the present invention is not affected.

A thermo-polymerization initiator may be also added to the liquid crystal composition. A polymerization reaction also proceeds in the polymerizable liquid crystals under heating, but when a thermo-polymerization initiator is contained, an isotropic phase state is assumed under heating of the polymerizable liquid crystal. As a result, isotropic phase sections 4 can be easily formed by efficiently polymerizing and curing in the isotropic phase state.

Radical polymerizable initiators can be advantageously used as the thermo-polymerization initiators. Examples thereof include azo compounds such as 2,2'-azobisisobutyronitrile, 2,2'-azobis-2-methylbutyronitrile, 2,2'-azobis(2,4-dimethylvaleronitrile), 2,2'-azobis(4-methoxy-2,4-dimethylvaleronitrile), 1,1'-azobis-1-cyclohexylnitrile, dimethyl-2,2'-azobisisobutyrate, 4,4'-azobis-4-cyanovaleric acid, 1,1'-azobis(1-acetoxy-1-phenylethane), and organic peroxides such as benzoyl peroxide, lauroyl peroxide, tert-butyl peroxide, 1,1-bis(tert-butyl peroxy)cyclohexane.

The thermo-polymerization initiator is preferably added within a range in which the orientation ability of the polymerizable liquid crystal is not significantly degraded. The thermo-polymerization initiator can be added to the fixed liquid crystal phase composition in an amount generally within a range 0.01 to 15 wt. %, preferably 0.1 to 12 wt. %, more preferably 0.5 to 10 wt. %.

A surfactant is preferably added to the liquid crystal composition. When a surfactant is added to the liquid crystal composition, the orientation ability of the liquid crystalline compound at the interface with air can be controlled in the coated film formed by coating the liquid crystal composition.

No specific limitation is placed on the surfactant, provided that the ability of the polymerizable liquid crystal to demonstrate liquid crystal properties is not degraded. Examples of suitable surfactants include nonionic surfactants such as polyoxyethylene alkyl ether, polyoxyethylene alkyl allyl ether, polyoxyethylene derivatives, polyoxyethylene—polyoxypropylene block polymers, polyoxyethylene sorbitan fatty acid esters, polyoxyethylene sorbitol fatty acid esters, polyoxyethylene fatty acid esters, and polyoxyethylene alkyl amines, and anionic surfactants such as fatty acid salts, alkylsulfuric acid esters, alkylbenzenesulfonates, alkylnaphthalenesulfonates, alkylsulfosuccinates, alkyldiphenyl ether disulfates, alkylphosphates, polyoxyethylene alkyl sulfuric acid esters, naphthalenesulfonic acid formalin condensates, special polycarboxylic acid-type polymer surfactants, and polyoxyethylene alkylphosphoric acid esters.

The surfactant is added to the liquid crystal composition generally within a range of 0.01 to 1 wt. %, preferably 0.05 to 0.5 wt. %.

After the coated film has been formed on the substrate 2 in the coated film formation process, the liquid crystal contained in the coated film is set into a liquid crystal phase state in the liquid crystal phase formation process.

The liquid crystal phase formation process is implemented by holding the coated film formed on the substrate 2 at a temperature at which the polymerizable liquid crystal demonstrates a liquid crystal phase, thereby setting the liquid crystal contained in the coated film into the liquid crystal phase state. In this case, the desired liquid crystal state, such a nematic liquid crystal state, is formed in the coated film according to the type of the liquid crystalline compound.

After the liquid crystal phase formation process, the portions of the coated film where the liquid crystal phase sections 5 have to be formed, that is, the liquid crystal phase formation sections, are irradiated with light and the liquid crystal phase sections 5 are formed by fixing the liquid crystalline compound in the liquid crystal phase formation sections in the liquid crystal phase state (liquid crystal phase section formation process).

A photomask patterned so that portions other than the liquid crystal phase formation sections are not exposed and only the liquid crystal phase formation sections can be exposed is placed on the coated film, and the light is irradiated from the outside toward the photomask surface. In this process, the light that passed through the photomask reaches the coated film, the liquid crystal phase formation sections present on the coated film are exposed, and the polymerizable liquid crystal in the liquid crystal phase formation sections is polymerized and fixed. The liquid crystals contained in the liquid crystal phase formation sections are thus fixed in a state in which the desired orientation ability is imparted thereto, and the liquid crystal phase sections 5 are formed.

Where the liquid crystal phase section formation process is thus carried out, the liquid crystal phase sections 5 can be formed in any locations of the coated film correspondingly to the photomask pattern. The liquid crystal contained in the zones of the coated film other than the liquid crystal phase sections 5, that is, in the zones that were not subjected to exposure, is not fixed despite being in the liquid crystal phase state.

In the liquid crystal phase section formation process, the crosslinking reaction proceeds when the coated film is irradiated with the light of a wavelength at which the liquid crystal is photosensitive, and the wavelength of the light for irradiating the coated film can be appropriately selected according to the type of the liquid crystal contained in the coated film. The light for irradiating the coated film is not limited to monochromatic light and may be light having a certain wavelength range including the photosensitivity wavelength of the liquid crystal.

From the standpoint of the amount of excitation energy, ionizing radiation is preferred as the light for exposure. The irradiation dose of the ionizing radiation is selected appropriately according to the type of the polymerizable liquid crystal used. When ultraviolet radiation is used as the ionizing radiation, the irradiation doze thereof is generally preferred to be regulated so that the exposure dose of the liquid crystal phase formation sections is about 10 to 1000 mJ/cm$^2$. The wavelength of the radiation is preferably about 200 to 450 nm.

A method of curing by irradiating the liquid crystal phase formation sections with an electron beam of about 50 to 500 Gy may be used for curing the liquid crystal contained in the liquid crystal phase sections 5.

The crosslinking reaction of the liquid crystal is preferably conducted by heating the coated film to a temperature that is 1 to 10° C. below the temperature at which the liquid crystal demonstrates phase transition from the liquid crystal phase to the isotropic phase. As a result, disorientation of the liquid crystal in the course of the crosslinking reaction can be reduced. Furthermore, from this standpoint it is preferred that the temperature at which the crosslinking reaction is conducted be 3 to 6° C. lower than the temperature at which the liquid crystal demonstrates phase transition from the liquid crystal phase to the isotropic phase.

In addition to the above-described method, the crosslinking reaction of the liquid crystal may be also implemented by a method of irradiating the coated film with light of a wavelength at which the liquid crystal is photosensitive, while heating the coated film in an inert gas atmosphere to a liquid crystal phase temperature (referred to as method A).

With the method A, the liquid crystal is crosslinked in the inert gas atmosphere and disorientation of liquid crystal molecules is inhibited better than in the case where the liquid crystal is crosslinked in the air atmosphere.

Furthermore, the crosslinking reaction of the liquid crystal may be also implemented by irradiating the coated film with light of a wavelength at which the liquid crystal is photosensitive, while heating the coated film to a liquid crystal phase temperature in an inert gas atmosphere or air atmosphere, thereby partially advancing the crosslinking reaction (referred to hereinbelow as partial crosslinking process), and then cooling the coated film to a temperature (Tc) at which the liquid crystal assumes a liquid crystal phase after the partial crosslinking process and then further irradiating the coated film with the light of the photosensitivity wavelength in this state to advance and complete the crosslinking reaction (referred to hereinbelow as method B). The aforementioned temperature Tc is a temperature at which the liquid crystal assumes a liquid crystal phase in the coated film prior to advancing the crosslinking reaction.

In the partial crosslinking process, the crosslinking reaction proceeds to a degree at which the orientation ability of the liquid crystal contained in the coating film is maintained, even if the coating film is cooled to the temperature Tc. Therefore, the degree to which the crosslinking reaction proceeds in the partial crosslinking process can be appropriately selected according to the type of the liquid crystal in the coated film or the coated film thickness, but it is generally preferred that the crosslinking reaction be advanced in the partial crosslinking process until the degree of crosslinking of the liquid crystal becomes 5 to 50.

The method B can be implemented either in the inert gas atmosphere or in the air atmosphere, but conducting it in the air atmosphere is preferred because the equipment necessary to implement the process of conducting the crosslinking reaction can be simplified and the production cost of the optical element can be reduced.

After the liquid crystal phase sections 5 have been formed in the liquid crystal phase formation process, the liquid crystalline compound in the zones other than the liquid crystal phase sections 5 is set into the isotropic phase state and then fixed in this isotropic phase state to form the isotropic phase sections 4 (isotropic phase section formation process).

In the isotropic phase section formation process, the liquid crystalline compound in the zones other than the liquid crystal phase sections 5 is set into the isotropic phase. For this purpose, the coated film is heated to the temperature at which the liquid crystalline compound is transformed into the isotropic phase (isotropic phase transition temperature) or to a higher temperature.

Thus, when the coated film is heated to the isotropic phase transition temperature of the liquid crystalline compound or to a higher temperature, the polymerizable liquid crystal in the zones other than the liquid crystal phase sections 5, that is, the polymerizable liquid crystal that was not polymerized in the liquid crystal phase section formation process, looses the orientation ability of a liquid crystal and is transformed into the isotropic state. Under irradiation with ultraviolet radiation at this temperature, the polymerizable liquid crystal located in the zones other than the liquid crystal phase sections 5 is polymerized and fixed in the isotropic phase state. As a result, the zones outside the liquid crystal phase sections 5 in the coated film can become the isotropic phase sections 4. The polymeriable liquid crystal may be polymerized and fixed not only by ultraviolet radiation, but also by heating.

The isotropic phase transition temperature can be measured with a measurement device such as DSC. Furthermore, the phase transition from the liquid crystal phase to the isotropic phase generally can be also recognized by the change in the form of the coated film observed under a polarization microscope. Because the liquid crystal molecules in the liquid crystal phase sections 5 are polymerized and fixed by light irradiation, the orientation ability of the liquid crystal formed in the liquid crystal phase sections 5 of the coated film is maintained even when the coated film is heated to the isotropic phase transition temperature or a higher temperature in the isotropic phase section formation process.

As the liquid crystalline compound contained in the portions where the isotropic phase has to be formed is fixed in the isotropic phase state, thereby forming the isotropic phase sections 4, in the isotropic phase section formation process, the layer thickness of the liquid crystal phase sections 5 of the coated film becomes larger than the layer thickness of the isotropic phase sections 4, and the liquid crystal phase sections 5 protrude with respect to the isotropic phase sections 4. In this case, even though the liquid crystal phase sections 5 become larger in layer thickness than the isotropic phase sections 4, the orientation ability of the liquid crystalline compound in the liquid crystal phase sections 5 is maintained.

In accordance with the present invention, the difference between the layer thickness of the liquid crystal phase sections 5 and the layer thickness of the isotropic phase sections 4 is defined as the "liquid crystal phase section protrusion height", and in FIG. 1, the liquid crystal phase section protrusion height is denoted by h.

The liquid crystal phase section protrusion height can be controlled by regulating the irradiation dose of ultraviolet radiation in the liquid crystal phase section formation process. Furthermore, the liquid crystal phase section protrusion height can be also controlled by regulating the heating temperature when conducting heating in the isotropic phase section formation process.

Thus, all the portions of the polymerizable liquid crystal coated on the substrate 2 can be cured, the fixed liquid crystal layer 3 can be formed, and the optical element 1 can be obtained.

With the method for manufacturing the optical element 1 in accordance with the present invention, the liquid crystal phase sections 5 can be formed in any zones of the coated film by using a pre-patterned photomask. Therefore, the optical element 1 wherein the liquid crystal phase sections 5 in which a phase difference occurs under light irradiation and the isotropic phase sections 4 in which no phase difference occurs even under light irradiation are patterned to any shape can be obtained easily and inexpensively.

With the method for manufacturing the optical element 1 in accordance with the present invention, the coated film is formed by coating a liquid crystal composition on the substrate 2, and the liquid crystal contained in the zones of the coated film that were not fixed in the liquid crystal phase state are fixed in the isotropic phase state. Because the liquid crystal phase sections 5 protrude beyond the isotropic phase sections 4 at this time, a step can be produced between the surface levels of the liquid crystal phase sections 5 and isotropic phase sections 4. Therefore, it is not necessary to perform a separate processing such as dry etching to form the step after the liquid crystal has been fixed in the isotropic phase state, the optical element 1 can be manufactured in an easy manner, and the production cost of the optical element 1 is easily reduced.

In the optical element of the present invention, a color layer 7 may be formed on the substrate 2 (referred to hereinbelow as optical element of the second embodiment).

Figure 3A:
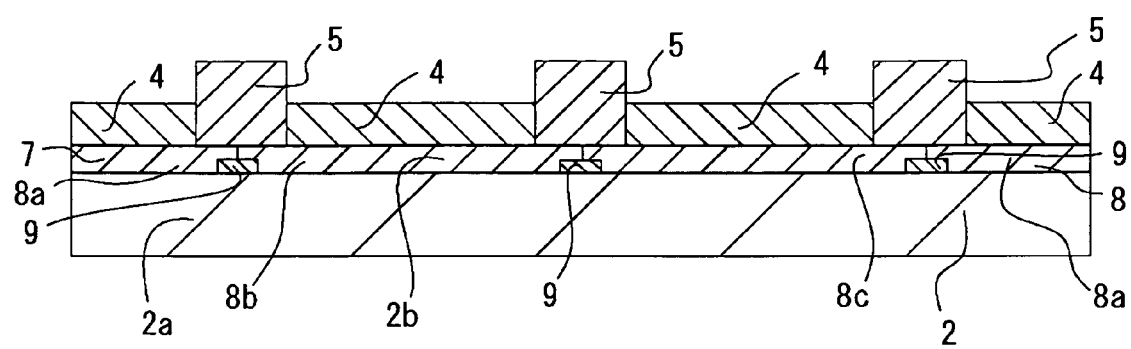
FIG. 3A is a cross-sectional simplified view illustrating an optical element comprising a color layer.

FIG. 3A is a schematic view illustrating the cross-sectional structure of an example of the optical element of the second embodiment.

As shown in FIG. 3A, in the optical element 1, the color layer 7 is formed as a functional layer on one surface of the substrate main section 2a of the substrate 2. The color layer 7 comprises color pixel sections 8 that transmit visible light in the predetermined wavelength range and light shielding sections 9 (sometimes referred to as black matrix or BM).

The color pixel sections 8 are formed by arranging the color pixels that transmit light in the wavelength bands of each color with respect to red, green, and blue colors (referred to as red color pixels 8a, green color pixels 8b, and blue color pixels 8c, respectively) according to the predetermined pattern. A variety of arrangement patterns such as a stripe pattern, a mosaic pattern, or a triangular pattern can be selected as the arrangement pattern of the red color pixels 8a, green color pixels 8b, and blue color pixels 8c constituting the color pixel sections 8.

Furthermore, color pixels that transmit light in the wavelength bands of auxiliary colors of each aforementioned color can be also used instead of the aforementioned color pixels (8a, 8b, 8c).

The color pixel sections 8 are formed by patterning coating films of coloration material dispersions prepared by dispersing a coloration material of a color pixel in a solvent for the color pixel (8a, 8b, 8c) of each color, for example, by a photolithography method, separately for the locations of the reflective display sections and transmissive display sections according to the predetermined shape. Here, the reflective display sections indicate the regions in the color pixel sections 8 transmitting the light falling on the liquid crystal display device when a reflective display is performed in the case where the optical element 1 is incorporated in the semi-transmissive semi-reflective liquid crystal display device, and the transmissive display sections indicate the regions in the color pixel sections 8 transmitting the light falling on the liquid crystal display device when a transmissive display is performed in the case where the optical element 1 is incorporated in the semi-transmissive semi-reflective liquid crystal display device.

In addition to the photolithography, the color pixel sections 8 can be also formed by coating the coloration material dispersion according to the predetermined shape for each color pixels (8a, 8b, 8c) of each color.

The color pixel sections 8 are patterned and formed so that color balance of color pixels is different in the reflective display sections and transmissive display sections for each color pixel (8a, 8b, 8c) of each color. The difference in the color balance in those regions can be also demonstrated by using the respectively different compositions of coloration material dispersions.

The light shielding sections 9 prevent the color pixels (8a, 8b, 8c) from overlapping, fill the gaps between the color pixels, thereby preventing the light from leaking (i.e., preventing light leak) from the adjacent color pixels, and inhibit color-induced deterioration of active elements in the case of using the optical element in the liquid crystal display device of an active matrix drive system.

Therefore, the light shielding sections 9 are formed so as to partition the regions corresponding to the zones where the color pixels are arranged on the surface of the substrate main section 2a for each individual color pixel (8a, 8b, 8c) in the plan view thereof. The color pixels (8a, 8b, 8c) of each color are arranged according to the formation locations of the region on the surface of the substrate main section 2a that was partitioned by the light shielding sections 9, so as to cover this region in the plan view thereof.

The light shielding sections 9 can be formed by patterning a metal thin film having light shielding ability and light absorbing ability, for example, a thin film of metallic chromium or a thin film of tungsten, on the surface of the substrate main section 2a according to the predetermined shape. Furthermore, the light shielding sections 9 can be also formed by printing an organic material such as a black resin or the like according to the predetermined shape.

The fixed liquid crystal layer 3 is laminated on the substrate 2 so that the zones of the isotropic phase sections 4 and liquid crystal phase sections 5 correspond in the thickness direction respectively to the transmissive display sections and reflective display sections of each color pixel (8a, 8b, 8c).

Incorporating such optical element in a semi-transmissive semi-reflective liquid crystal display device makes it possible to perform color display in the liquid crystal display device.

Figure 3B:
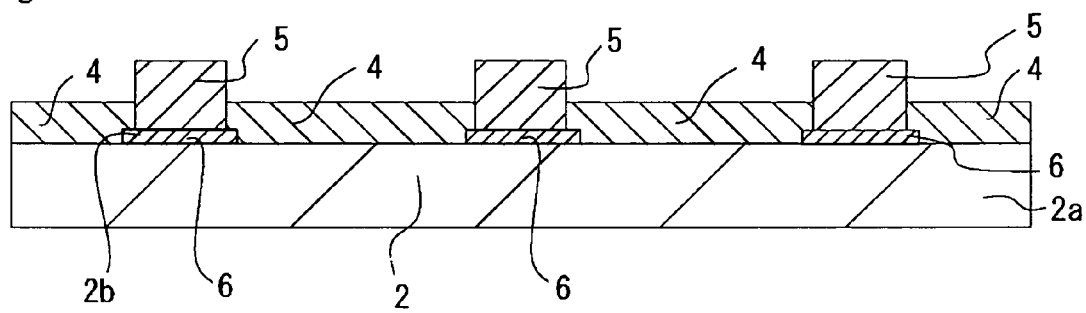
FIG. 3B is a cross-sectional simplified view illustrating an optical element comprising a light reflecting section.

In the optical element of the present invention, the substrate 2 may be obtained by providing light reflecting sections that reflect light locally on the substrate main section 2a and forming the fixed liquid crystal layer 3, while positioning the liquid crystal phase sections 5 on the light reflecting sections 6 (referred to hereinbelow as the third embodiment) (FIG. 3B).

Such optical element can be used by incorporating in a semi-transmissive semi-reflective liquid crystal display device. In such optical element, the regions on the substrate main section 2a where the light reflecting sections 6 were provided constitute the reflective display regions, and the regions where the light reflecting sections 6 have not been provided constitute the transmissive display regions.

Figure 4:
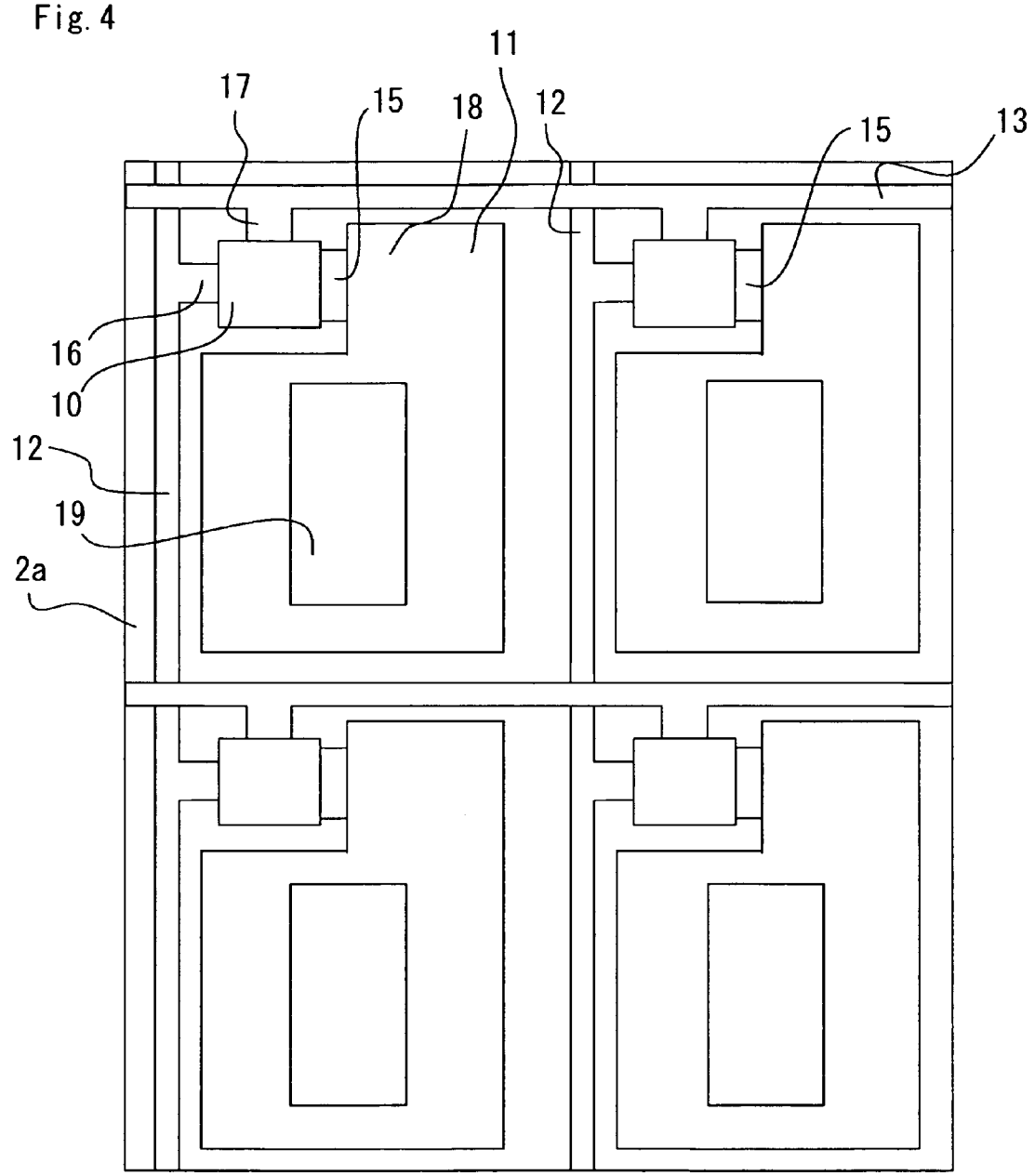
FIG. 4 is a is a schematic plan view illustrating an optical element comprising a switching circuit.

In the optical elements of the present invention, switching circuits may be provided on the fixed liquid crystal layer (referred to hereinbelow as the fourth embodiment) (FIG. 4).

FIG. 4 is a schematic partial plan view illustrating an example of the optical element of the fourth embodiment.

Switching circuits 10 are configured as a layer by laminating on the substrate main section 2a corresponding to the transparent electrode sections 19 and reflecting electrode sections 11 that are provided respectively for each pixel for the transmissive display and each pixel for the reflective display, and the switching circuits together with various elements such as signal lines or scanning lines electrically connected thereto form an element substrate as a functional layer 2b.

In the switching circuits 10, the conductivity state of the signal lines 12 and electrode sections 11 is controlled by receiving electric signals from the scanning lines 13. Specific examples of active elements that can serve as the switching circuits 10 include three-terminal elements such as thin-film transistors (TFT) and two-terminal elements such as MIM (Metal Insulator Metal) diodes.

When the switching circuit 10 is a thin-film transistor, on the substrate 2 the switching circuit 10 is formed by laminating a drain electrode 15 connected to each pixel electrode 18 composed of a transparent electrode section 19 and reflecting electrode section 11, a source electrode 16 for receiving the supply of electric signals from the signal line 12, and a semiconductor introduced between the drain electrode 15 and source electrode 16 for connecting the two electrodes, and then laminating a gate electrode 17 via an insulating layer (not shown in the figure) on the semiconductor. The gate electrode is connected to the scanning line 13.

A transparent electrode such as ITO (Indium Tin Oxide) is preferably used as the electrode section 11 and it can be formed by arranging on almost the entire surface of the region where each pixel will be formed. The electrode section 11 can be also formed by providing a transparent electrode in the form of a thin stripe on the edge section of each pixel region.

Such optical element can be used by incorporating in a semi-transmissive semi-reflective liquid crystal display device.

The liquid crystal display device in accordance with the present invention will be explained below.

First, a semi-transmissive semi-reflective liquid crystal display device incorporating the optical element of the first embodiment (the liquid crystal display device of the first embodiment) will be explained.

Figure 5A:
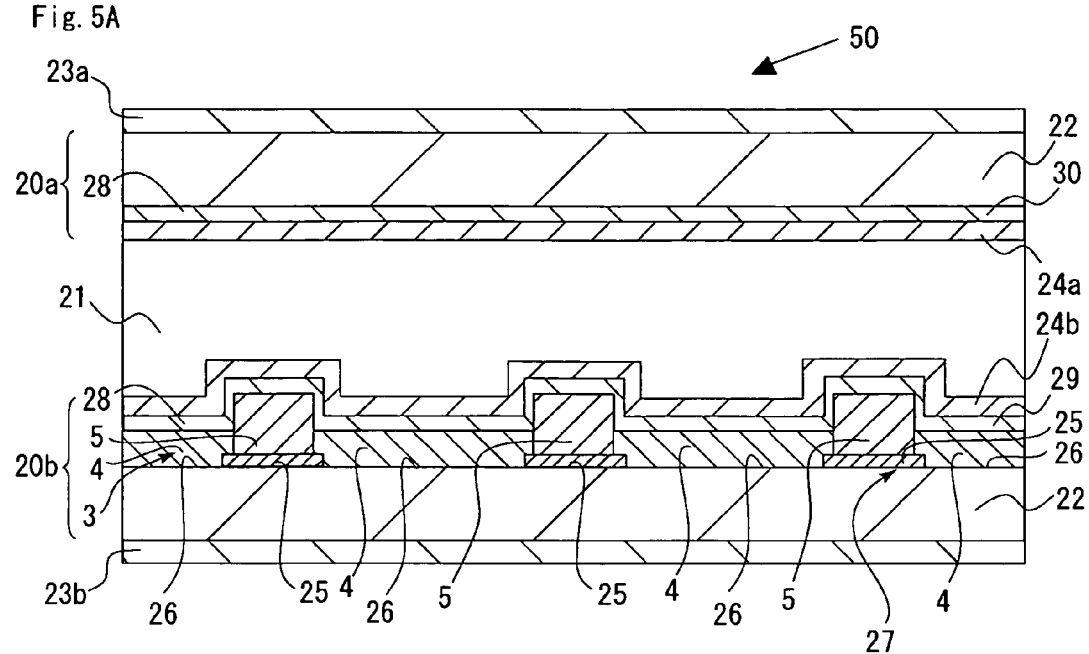
FIG. 5A is a cross-sectional simplified view illustrating a liquid crystal display device comprising an optical element.
Figure 5B:
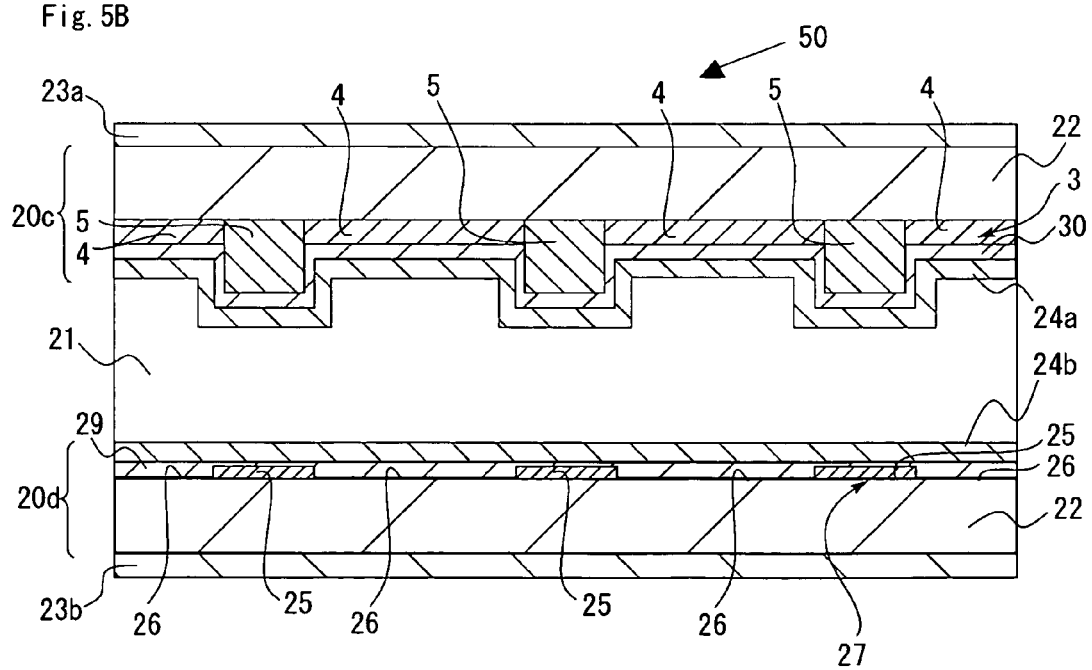
FIG. 5B is a cross-sectional simplified view illustrating another embodiment of the liquid crystal display device.

FIG. 5A and FIG. 5B are schematic drawings illustrating an example of the semi-transmissive semi-reflective liquid crystal display device in accordance with the present invention.

A liquid crystal display device incorporating the optical element of the first embodiment in one laminated member will be explained as the example of the liquid crystal display device.

As shown in FIG. 5A, a liquid crystal display device 50 comprises two laminated members 20a, 20b disposed opposite each other, a drive liquid crystal layer 21 formed between the laminated members 20a, 20b, and polarization plates 23a, 23b provided on the outer surface side of a substrate 22.

In the laminated members 20a, 20b, oriented films 24a, 24b are formed between the respective substrates 22 and liquid crystal layer 21, and light reflecting sections 25 are formed with a constant pattern between the substrate 22 and oriented film 24b in the laminated member 20b. A multiplicity of light transmitting sections 26 are disposed according to a constant pattern so as to be adjacent to the light reflecting sections 25. A semi-transmissive semi-reflective layer 27 is formed by such patterned light reflecting sections 25 and light transmitting sections 26.

The light reflecting sections 25 are made from a light reflecting materials, and a metal thin film, for example, of aluminum, silver, or alloys thereof can be used for the light reflecting sections 25.

Electrode sections 28 are formed between the substrates 22, 22 and oriented films 24a, 24b in the laminated members 20a, 20b; the electrode sections 28 comprise pixel electrodes 29 formed for each pixel and counter electrodes 30 opposing the pixel electrodes 29. The pixel electrodes 29 and counter electrode 30 are preferably composed of a transparent electrically conductive film such as ITO.

A fixed liquid crystal layer 3 is lamination formed on the substrate 22 in the laminated member 20b. The liquid crystal phase sections 5 of the fixed liquid crystal layer 3 are provided on the light reflecting sections 25, and the isotropic phase sections 4 are disposed in the formation positions of the light transmitting sections 26.

Here, the region where the light reflecting sections 25 were formed in the laminated member 20b form reflective display regions serving as regions that can reflect the light propagating inside the liquid crystal layer 21 when a bright-dark display is performed in the reflective display. On the other hand, correspondingly thereto, the regions where the light transmitting sections 26 were formed form the transmissive display regions serving as regions that can transmit the light propagating inside the liquid crystal layer 21 when a bright-dark display is performed in the transmissive display. Furthermore, in the laminated member 20a, reflective display regions and transmissive display regions are formed in positions opposite, in the thickness direction of the laminated member 20b, the light reflecting sections 25 and light transmitting sections 26 of the laminated member 20b.

The fixed liquid crystal layer 3 is thus formed so that the liquid crystal phase sections 5 are disposed in the reflective display regions and that the isotropic phase sections 4 are disposed in the transmissive display regions. The liquid crystal display device 50 of this embodiments represents a mode in which an optical element comprising a substrate having the semi-transmissive semi-reflective layer 27 formed as a functional layer on the substrate main section 22b is incorporated in the device.

For example a protective layer (not shown in the figure) such as an insulating film, for example, an acrylic photosensitive resin may be laminated on the fixed liquid crystal layer 3 to protect the structure therefor.

The oriented films 24a, 24b are from a polyimide or the like, and are horizontally oriented films for causing horizontal orientation of liquid crystals in the liquid crystal layer 21 or vertically oriented films for causing vertical orientation of these liquid crystals. Whether to use horizontally oriented films or vertically oriented films as the oriented films can be selected appropriately.

The liquid crystal layer 21 is formed by enclosing liquid crystals between the laminated members 20a, 20b, as will be shown below.

First, the laminated members 20a, 20b disposed opposite each other via a gap are fixed with spacers (for example, spherical spacers or columnar spacers) so as to obtain a spacing gap (cell gap) therebetween, and partitioned space sections are formed between the laminated members 20a, 20b by using a sealing material comprising an ultraviolet-curable resin or a thermosetting resin. A liquid crystal material is loaded into the space sections, thereby enclosing the liquid crystals and forming the liquid crystal layer 21.

Liquid crystals such as TN (Twisted Nematic) liquid crystals are appropriately selected as the liquid crystals to be enclosed in the liquid crystal layer 21, which is the drive liquid crystal layer, and are configured so that the orientation thereof can be controlled by an external electric field.

For example, in the case where the liquid crystals enclosed in the liquid crystal layer 21 are TN liquid crystals, when a voltage is applied to the liquid crystal layer 21, the liquid crystal molecules having an elongated shape assume a state in which they are oriented so that the longitudinal direction thereof is along the electric field direction, that is, a state in which the liquid crystal molecules are oriented in the direction perpendicular to the surface of the oriented film 24a in FIG. 5A. If light is passed through the liquid crystal layer 21 in this state, then a phase difference between the light before passing through the liquid crystal layer 21 and the light that passed therethrough will be almost zero for both the light passing through the reflective display regions and the light passing through the transmissive display regions.

On the other hand, when no voltage is applied to the liquid crystal layer 21, the liquid crystal molecules assume a state of orientation in the direction horizontal with respect to the surface of the oriented film 24a shown in FIG. 5A. In the reflective display regions, the liquid crystal molecules in the liquid crystal layer 21 are arranged in a mutually twisted state.

If light passes through such liquid crystal layer 21, a phase difference occurs between the light before passing through the liquid crystal layer 21 and the light that passed therethrough. Furthermore, refractive index anisotropy $\Delta n$ of liquid crystals enclosed in the liquid crystal layer 21 and thickness d of the liquid crystal layer are designed in advance and the protrusion height of the liquid crystal phase sections 5 with respect to the isotropic phase sections 4 in the fixed liquid crystal layer 3 is set so that this phase difference is ¼ wavelength of the light passing through the portions of the liquid crystal layer 21 sandwiched by the reflective display regions of the laminated members 20a, 20b and is ½ wavelength for the light passing through the portions of the liquid crystal layer 21 sandwiched between the transmissive display regions of the laminated members 20a, 20b.

The liquid crystal phase section protrusion height h is determined so as to generated a phase difference of $\lambda/4$ between the light that passes through the transmissive display regions and the light that passes through the reflective display regions.

In the liquid crystal display device 50, the light that propagated inside the liquid crystal layer 21 toward the laminated member 20a in the thickness direction of the liquid crystal layer 21, passed through the laminated member 20a, and was outputted to the outside of the liquid crystal display device is recognized by a person viewing the display.

In such liquid crystal display device 50, in the reflective display, the light (external light) enters from the outside of the laminated member 20a in the direction toward to the liquid crystal layer 21, and when this light passes through the reflective display regions of the laminated member 20a, the light is transmitted through the liquid crystal layer 21, reflected by light reflecting sections 25 disposed in the reflective display regions of the laminated member 20b, and propagates from the liquid crystal layer 21 toward the reflective display regions of the laminated member 20a.

Furthermore, in the liquid crystal display device 50, in the transmissive display, the light enters from the laminated member 20b in the direction toward the liquid crystal layer 21, and when this light passes through the transmissive display regions of the laminated member 20b, it propagates in the liquid crystal layer 21 toward the transmissive display regions of the laminated member 20a.

This liquid crystal display device is provided with a light reflection unit comprising a light source, a light guiding plate that spreads the light generated by the light source by guiding in the plane direction of the laminated member 20b, and a light reflecting plate that causes the light guided by the light guiding plate to propagate in the direction of the laminated member 20b and is configured so that when light is introduced in the direction of the laminated member 20b in the transmissive display, the light from the light reflecting unit falls on the laminated member 20b.

In the liquid crystal display device 50, the liquid crystalline compound is oriented in the direction close to the plane direction of the liquid crystal layer 21 and the adjacent liquid crystalline compounds are oriented in the mutually twisted positions in response to changes in the state of voltage application to the liquid crystal layer 21, following changes in the conductivity state of the electrode section 28, whereby the liquid crystals enclosed in the liquid crystal layer 21 generate a phase difference in the light propagating in the liquid crystal layer 21, or the liquid crystalline compounds adjacent in the thickness direction are oriented in the thickness direction of the liquid crystal layer 21, whereby practically no phase difference is generated in the light propagating in the liquid crystal layer 21. By so controlling the orientation of liquid crystals in the liquid crystal layer 21 in accordance with the change in the state of voltage application to the liquid crystal layer 21, the presence or absence and intensity of light reaching a person viewing the display from the liquid crystal display device 50 is controlled and the bright-dark state in the reflective display or transmissive display is controlled.

In the liquid crystal display device 50 in accordance with the present invention, the reflective display and transmissive display are performed at the same time, and the bright-dark states in those display modes are formed in the manner as follows.

First, the reflective display will be explained.

The light (external light) introduced from the outside of the laminated member 20a in the direction toward the liquid crystal layer 21 is transmitted through the polarization plate 23a, becomes the linearly polarized light having a polarization axis parallel to the transmission axis of the polarization plate 23a, and passes through the reflective display regions of the laminated member 20a. Then, when a voltage is applied, this linearly polarized light is transmitted through the liquid crystal layer 21, while practically maintaining the polarization state thereof, and then transmitted via the liquid crystal phase sections 5 of the fixed liquid crystal layer 3. In this process, a phase difference of ¼ wavelength is imparted to this light and the light is converted into a circularly polarized light. This circularly polarized light is reflected by the light reflecting sections 25 of the semi-transmissive semi-reflective layer 27, and the polarization direction thereof is inverted (the rotation direction is reversed). Thus, the left-right circularly polarized lights are mutually converted. The circularly polarized light produced by reflection by the light reflecting sections 25 and reversal of polarization direction is transmitted through the liquid crystal phase sections 5 from the liquid crystal layer 21 in the direction toward the reflective display regions of the laminated member 20a. In this process, a phase difference of ¼ wavelength is imparted to this light and the light is converted into a linearly polarized light that propagates toward the liquid crystal layer 21. At this time, the polarization axis of this linearly polarized light assumes a state almost perpendicular to that of the linearly polarized light during propagation from the liquid crystal layer 21 toward the fixed liquid crystal layer 5.

This linearly polarized light is then transmitted through the liquid crystal layer 21, while maintaining the state thereof. Because the polarization axis of this linearly polarized light is also perpendicular to the transmission axis of the polarization plate 23a, this light is absorbed by a colorant constituting the polarization plate 23a, the light propagating toward a person viewing the display on the outside of the liquid crystal display device is practically eliminated and the person viewing the display recognizes the dark display.

On the other hand, when no voltage is applied, the light that propagated from the laminated member 20a toward the liquid crystal layer 21 and became a linearly polarized light acquires a phase difference of ¼ wavelength when passing through the liquid crystal layer 21, and when this light is further transmitted through the liquid crystal phase sections 5 of the fixed liquid crystal layer 3, a phase difference of ¼ wavelength it is imparted thereto. In this case, the light transmitted through the liquid crystal phase sections 5 becomes a light having a phase difference of ½ wavelength with respect to the linearly polarized light that is to propagate therefrom toward the liquid crystal layer 21 and, therefore, becomes a linearly polarized light. The linearly polarized light transmitted through the liquid crystal phase sections 5 is reflected by the light reflecting sections 25 of the semi-transmissive semi-reflective layer 27, and a linearly polarized light with the same light polarization axis is formed.

The light reflected by the light reflecting sections 25 is transmitted through the liquid crystal phase sections 5 and liquid crystal layer 21, but because this light acquires a phase difference of ¼ wavelength in each of these media, in the position of reaching the polarization plate 23a, the total phase difference is ½ wavelength and a linearly polarized light having a polarization axis parallel to the transmission axis of the polarization plate 23a is formed. This linearly polarized light is transmitted through the polarization plate 23a and propagates toward the outside of the liquid crystal display device.

The light is outputted to the outside from the liquid crystal display device 50 and this light is recognized as a bright display by the person viewing the display.

The transmissive display will be explained below.

In the transmissive display, the light enters from the position outside the laminated member 20b in the direction toward the liquid crystal layer 21. When the light falls, the component of this light that is horizontal with respect to the light transmission axis of the polarization plate 23b is transmitted through the polarization plate 23b and a linearly polarized light is formed. When this light passes through the laminated member 20b toward the transmissive display region, it is transmitted through isotropic phase sections 4 of the fixed liquid crystal layer 3. At this time practically no phase difference is generated in the linearly polarized light, and the light propagates toward the liquid crystal layer 21, while maintaining the linearly polarized state thereof. When a voltage is applied, this linearly polarized light is transmitted through the liquid crystal layer 21, while practically maintaining the state thereof, that is, maintaining an almost constant polarization axis.

Here, the polarization plates 23a, 23b of the laminated members 20a, 20b are disposed in a cross Nicol's configuration, and the polarization axis of the linearly polarized light that passed through the polarization plate 23b remains almost constant until the polarization plate 23a is reached. Therefore, this linearly polarized light is absorbed by the polarization plate 23a and practically no light propagates toward the person viewing the display. Accordingly, the person viewing the display recognizes the dark display.

On the other hand, when no voltage is applied, a phase difference of ½ wavelength is imparted to the linearly polarized light propagating toward the liquid crystal layer 21 when the light is transmitted through the liquid crystal layer 21, and the polarization axis of the light changes. Thus, the polarization axis of the light changes so that the polarization axes before and after the light is transmitted through the liquid crystal layer 21 are almost perpendicular to each other. Further, because the polarization plated 23a, 23b disposed in a cross Nicol's configuration and the light that passed through the liquid crystal layer 21 assumed a state in which the polarization axis thereof is almost parallel to the transmission axis of the polarization plate 23a of the laminated member 20a, the light passes through the polarization plate 23a. Therefore, the light propagates from the liquid crystal display device toward the person viewing the display, and the person viewing the display recognizes the bright display.

In the liquid crystal layer 50, the optical element 1 is incorporated by laminating the fixed liquid crystal layer 3 in the laminated members 20b holding the liquid crystal layer 21 and the liquid crystal phase sections 5 demonstrating the function of a ¼ wavelength plate are formed in the reflective display regions. Therefore, it is not necessary to prepare separately a ¼ wavelength plate, such as a film, and attach it to the laminated members 20a, 20b, no need to provide an adhesive layer for such attachment, and the thickness of the configuration can be easily decreased.

Furthermore, in the conventional liquid crystal display devices, when a ¼ wavelength plate was attached to the side of the laminated member 20a, the light that passed through the transmissive display regions also passed through the ¼ wavelength plate. Therefore, a configuration was used in which the ¼ wavelength plate was also attached to the side of the laminated member 20b on the opposite side. By contrast, with the liquid crystal display device 50, because the liquid crystal phase sections 5 demonstrating the function of a ¼ wavelength plate are formed in the reflective display regions, the installation of the ¼ wavelength plate on the side of the laminated member 20b is not required.

Furthermore, in the conventional liquid crystal display devices, when a transmissive display was performed and part of the light introduced from the laminated member 20b toward the liquid crystal layer 21 was transmitted through the ¼ wavelength plate and propagated toward the reflective display regions, because the ¼ wavelength plate was attached to the side of the laminated member 20b, this light could not be reused and the increase in the light utilization efficiency was limited. By contrast, with the liquid crystal display device 50, because the installation of ¼ wavelength plate is not required, when the transmissive display is performed, the light that was reflected by the light reflecting sections 25, even the light that propagated toward the reflective display regions, can pass through the polarization plate 23b and this light can be caused to propagate toward the transmissive display regions, that is, the light can be reused.

The liquid crystal display device in accordance with the present invention is not limited to the configuration in which the optical element is incorporated in the laminated member 20b as in the liquid crystal display device of the first embodiment, and a configuration may be employed in which the optical element is incorporated in the laminated member 20a (referred to hereinbelow as the liquid crystal display device of the second embodiment) (FIG. 5B).

In the liquid crystal display device 50, a laminated member 20c is formed in which the fixed liquid crystal layer 3 is incorporated between the substrate 22 and oriented film 24a. In such laminated member 20c, the fixed liquid crystal layer 3 is formed so that the liquid crystal phase sections 5 and isotropic phase sections 4 correspond to the reflective display regions and transmissive display regions, respectively.

A laminated member 20d is provided in a position below the laminated member 20c correspondingly thereto. In the laminated member 20d, light reflecting section 25 and light transmitting sections 26 are provided on the substrate 22 and an oriented film 24b is provided on the upper surface thereof.

This liquid crystal display device 50 forms a bright-dark state in the reflective display and transmissive display in the manner as follows.

First, the reflective display mode will be explained.

The light (external light) introduced from the outside of the laminated member 20c in the direction toward the liquid crystal layer 21 is transmitted via the polarization plate 23a, becomes a linearly polarized light having a polarization axis parallel to the transmission axis of the polarization plate 23a, and passes through the reflective display regions of the laminated member 20c. Then, this linearly polarized light is transmitted through the liquid crystal phase sections 5 of the fixed liquid crystal layer 3. At this time, a phase difference of ¼ wavelength is imparted to the light and the light is converted into a circularly polarized light. When a voltage is applied, this circularly polarized light is transmitted, while almost maintaining the state thereof, through the liquid crystal layer 21 and reflected by the light reflecting sections 25 of the semi-transmissive semi-reflective layer 27. At this time the polarization direction thereof is reversed. The circularly polarized light that was reflected by the light reflecting sections 25 and whose polarization direction was reversed then propagates through the liquid crystal layer 21 in the thickness direction thereof toward the liquid crystal phase sections 5 of the fixed liquid crystal layer 3 and then passes through the liquid crystal phase sections 5. When the circularly polarized light is transmitted through the liquid crystal phase sections 5, a phase difference of ¼ wavelength is imparted to the light and the light is converted into a linearly polarized light. At this time, the polarization axis of the linearly polarized light assumes a state almost perpendicular to the polarization axis of the linearly polarized light at the time of propagation from the polarization plate 23a toward the fixed liquid crystal layer 5 and a state almost perpendicular to the transmission axis of the polarization plate 23a. Therefore, the linearly polarized light is absorbed by the colorant constituting the polarization plate 23a and practically does not propagate toward a person viewing the display outside the liquid crystal display device. Accordingly, the person viewing the display recognizes the dark display.

On the other hand, when no voltage is applied, if the light that propagated from the laminated member 20c in the direction toward the liquid crystal layer 21 and became the linearly polarized light passes through the liquid crystal phase sections 5 of the fixed liquid crystal layer 3, a phase difference of ¼ wavelength is imparted to the light, and when this light is further transmitted through the liquid crystal layer 21, the a phase difference of ¼ wavelength is imparted to the light. At this time, the light that passed through the liquid crystal layer 21 assumes a state in which a phase difference of ½ wavelength is imparted to the light with respect to the light that is to be transmitted through the liquid crystal phase sections 5 toward the liquid crystal layer 21 and the light becomes a linearly polarized light. This linearly polarized light is then reflected by the light reflecting sections 25 of the semi-transmissive semi-reflective layer 27, and a linearly polarized light is formed. At this time, the polarization axes of the linearly polarized light before and after the reflection by the light reflecting sections 25 are the same.

The linearly polarized light that was reflected by the light reflecting sections 25 is transmitted through the liquid crystal layer 21 and liquid crystal phase sections 5, but because a phase difference of ¼ wavelength is imparted thereto in this process, in the position where the light reaches the polarization plate 23a, the light assumes a state with a phase difference of ½ wavelength and becomes a linearly polarized light having a polarization axis parallel to the transmission axis of the polarization plate 23a. As a result, this linearly polarized light is transmitted via the polarization plate 23a and can propagate toward the outside of the liquid crystal display device 50. The light that exited to the outside from the liquid crystal display device 50 is recognized as the bright display by a person viewing the display device.

The transmissive display will be described below.

In the transmissive display, the light falls from the outside of the laminated member 20d in the direction toward the liquid crystal layer 21. If the light thus falls, the component of this light that is horizontal with respect to the transmission axis of the polarization plate 23b is transmitted through the polarization plate 23b and a linearly polarized light is formed. This linearly polarized light passes through the laminated member 20d and propagates into the liquid crystal layer 21 toward the transmissive display regions. When a voltage is applied, the linearly polarized light passes through the liquid crystal layer 21, while almost maintaining the polarization state thereof, that is, maintaining a state in which the polarization axis thereof is almost constant. The linearly polarized light that passed through the liquid crystal layer 21 is transmitted through the isotropic phase sections 4 of the fixed liquid crystal layer 3, but here, too, practically no phase difference appears in the linearly polarized light. The linearly polarized light then reaches the position where the polarization plate 23a of the laminated member 20c is disposed, but because the linearly polarized light has a polarization axis almost perpendicular to the transmission axis of the polarization plate 23a, the light does not pass through the polarization plate 23a and, therefore, practically does not exit to the outside of the liquid crystal display device 50. As a result, the dark state is recognized by a person viewing the display.

On the other hand, when no voltage is applied, if the linearly polarized light that propagates from the side of the laminated member 20*d* toward the liquid crystal layer 21 passes through the liquid crystal layer 21, a phase difference of ½ wavelength is imparted to the light, the polarization axis thereof changes, and a linearly polarized light is formed. At this time the polarization axes of the linearly polarized light before and after transmission through the liquid crystal layer are almost perpendicular to each other. Because the polarization plates 23*a*, 23*b* form a cross Nicol's configuration, the linearly polarized light that passed through the liquid crystal layer 21 assumes a state in which the light has a polarization axis almost parallel to the transmission axis of the polarization plate 23*a* and this light can pass through the polarization plate 23*a*. Therefore, this linearly polarized light can propagate toward the outside of the liquid crystal display device 50 in the direction of the person viewing the display, and the person viewing the display recognizes the bright display.

The liquid crystal display device of the second embodiment demonstrates the effect identical to that of the liquid crystal display device of the first embodiment.

Figure 6A:
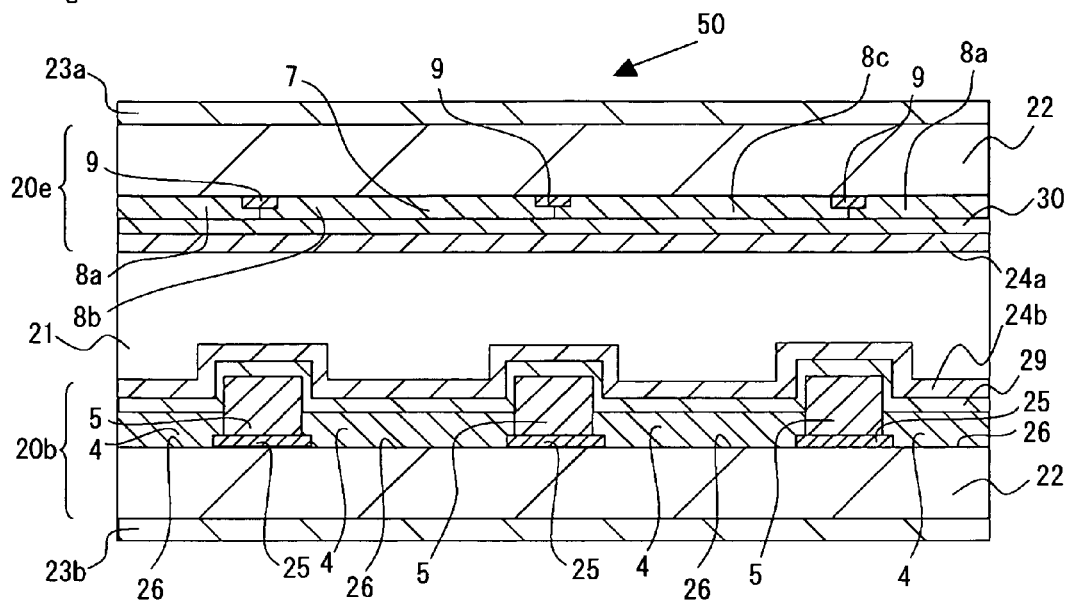
FIG. 6A is a cross-sectional simplified view illustrating another embodiment of the liquid crystal display device.
Figure 6B:
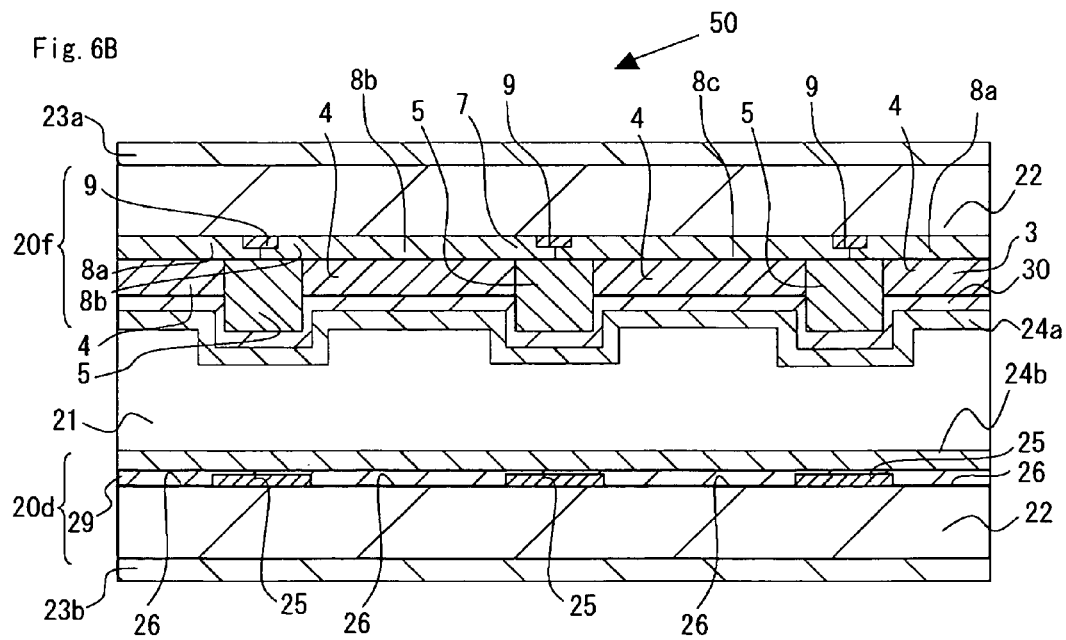
FIG. 6B is a cross-sectional simplified view illustrating another embodiment of the liquid crystal display device.
Figure 7:
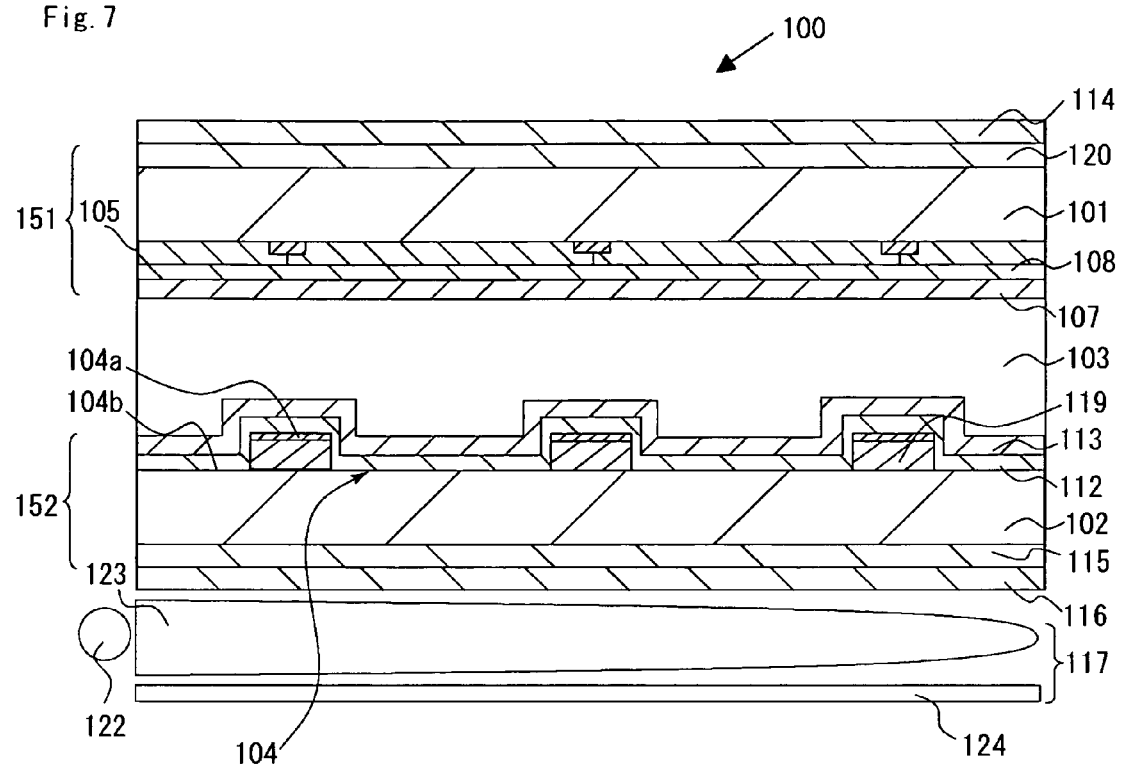
FIG. 7 is a cross-sectional simplified view illustrating the conventional liquid crystal display device.

The liquid crystal display device of the third embodiment in accordance with the present invention has a laminated member 20*e* provided with a color layer 7 as a functional layer, as shown in FIG. 6A and FIG. 6B. This liquid crystal display device has a structure of the liquid crystal display devices of the first embodiment and second embodiment in which an optical element of the third embodiment having a color layer 7 and a fixed liquid crystal layer 3 laminated on a substrate 22 is incorporated in a laminated member.

First, a semi-transmissive semi-reflective liquid crystal display device in which the optical element of the third embodiment is incorporated in the liquid crystal display device of the first embodiment (this liquid crystal display device will be referred to as the liquid crystal display device of the third embodiment), that is, the case where the liquid crystal display device is an active matrix device, will be explained by way of an example.

FIG. 6A is a schematic cross-sectional view illustrating an example in which the optical element of the third embodiment is incorporated in the liquid crystal display device of the first embodiment.

In the liquid crystal display device 50, a laminated member 20*e* is formed that is configured by laminating on the substrate 22 the color layer 7 having color pixel sections 8*a*, 8*b*, 8*c* corresponding to colors R (red), G (green), and B (blue) and a light-shielding section 9 in the laminated member 20*a* shown in the explanation of the liquid crystal display device of the first embodiment. In this case, the color pixel sections 8*a*, 8*b*, 8*c* are formed so that the reflective display sections correspond to reflective display regions and also so that the transmissive display sections correspond to transmissive display regions.

The liquid crystal display device 50 is provided with the laminated member 20*b* shown in the explanation of the liquid crystal display device of the first embodiment, and the liquid crystal layer 21 is formed between the laminated member 20*b* and laminated member 20*e*.

The laminated member 20*b* and laminated member 20*e* are provided so that the light reflecting sections 25 of the laminated member 20*b* correspond, in the thickness direction of the liquid crystal layer 21, to the reflective display sections formed in the laminated member 20*e*, and so that the light transmitting sections 26 of the laminated member 20*b* correspond, in the thickness direction of the liquid crystal layer 21, to the transmissive display sections formed in the laminated member 20*e*.

The liquid crystal display device 50 performs the reflective display or transmissive display in the same manner as the liquid crystal display device of the first embodiment and demonstrates the same effect as the liquid crystal display device of the first embodiment.

A semi-transmissive semi-reflective liquid crystal display device in which the optical element of the third embodiment is incorporated in the liquid crystal display device of the second embodiment (this liquid crystal display device will be referred to as the liquid crystal display device of the fourth embodiment) will be explained below.

FIG. 6B is a schematic cross-sectional view illustrating an example in which the optical element of the third embodiment is incorporated in the liquid crystal display device of the second embodiment.

In the liquid crystal display device 50, a laminated member 20*f* is formed that is configured by laminating on the substrate 22 the color layer 7 having color pixel sections 8*a*, 8*b*, 8*c* corresponding to colors R (red), G (green), and B (blue) and a light-shielding section 9 in the laminated member 20*c* shown in the explanation of the liquid crystal display device of the second embodiment. In this case, the color pixel sections 8*a*, 8*b*, 8*c* are formed so that the reflective display sections correspond to reflective display regions and also so that the transmissive display sections correspond to transmissive display regions.

In the laminated member 20*f*, a fixed liquid crystal layer 3 is formed on the lower surface of the color layer 7. At this time, the fixed liquid crystal layer 3 is formed so that the liquid crystal phase sections 5 correspond to reflective display sections of the color layer 7 and so that the isotropic phase sections 4 correspond to the transmissive display sections of the color layer 7.

Furthermore, in the liquid crystal display device 50, the laminated member 20*d* shown in the explanation of the liquid crystal display device of the second embodiment is disposed so as to correspond to the laminated member 20*f*, and a liquid crystal layer 21 is formed between the laminated member 20*d* and laminated member 20*f*.

The laminated member 20*d* and laminated member 20*f* are provided so that the light reflecting sections 25 of the laminated member 20*d* correspond, in the thickness direction of the liquid crystal layer 21, to the reflective display sections formed in the laminated member 20*f*, and so that the light transmitting sections 26 of the laminated member 20*d* correspond, in the thickness direction of the liquid crystal layer 21, to the transmissive display sections formed in the laminated member 20*f*.

The liquid crystal display device 50 performs the reflective display or transmissive display in the same manner as the liquid crystal display device of the second embodiment and demonstrates the same effect as the liquid crystal display device of the second embodiment.

In the liquid crystal display devices of the first to fourth embodiments, an element substrate layer having a switching circuits 10 formed therein can be provided on the laminated members 20*a*, 20*b*, 20*c*, 20*d*, 20*e*, and 20*f*.

For example, an element substrate layer can be formed by connecting the switching circuits 10 to the pixel electrodes 29 constituting the electrode sections 28 of the laminated member 20b and laminated member 20d.

EXAMPLES

Example 1

A substrate was prepared by successively laminating a color layer and an oriented film on a substrate main section as described hereinbelow, and an optical element was obtained by using such substrate.

Preparation of Coloration Material Dispersions for Formation of Color Layer

Pigment dispersion-type photoresists were used as coloration material dispersions for black matrix (BM) and color pixels of red (R), green (G), and blue (B). The pigment dispersion-type photoresist was obtained by using a pigment as a coloration material, adding beads to a dispersion composition (comprised a pigment, a dispersant, and a solvent), dispersing for 3 h in a dispersing apparatus, removing the beads, and mixing the dispersion thus obtained with a clear resist composition (comprised a polymer, a monomer, an additive, an initiator, and a solvent). The pigment dispersion-type photoresists had the following compositions in the case of using for forming reflective display sections in the RGB color pixels. The RGB pigment dispersion type photoresist used for forming the transmissive display sections in color pixels had a compounded quantity of the pigment twice as large as that of the pigment contained in the pigment dispersion-type photoresist used for forming the reflective display sections. A paint shaker (manufactured by Asada Tekko KK) was used as the disperser.

(Photoresist for Black Matrix)
- Black pigment . . . 14.0 parts by weight
  (manufactured by Obi Shoka Kogyo KK, TM Black #9550)
- Dispersant . . . 1.2 part by weight
  (manufactured by Byk-Chemie Co., Ltd., Disperbyk 111)
- Polymer . . . 2.8 parts by weight
  (manufactured by Showa Polymer Co., Ltd., VR60)
- Monomer . . . 3.5 parts by weight
  (manufactured by Sartomer Co., SR399)
- Additive . . . 0.7 part by weight
  (manufactured by Soken Kagaku KK, L-20))
- Initiator . . . 1.6 part by weight
  (2-benzyl-2-dimethylamino-1-(4-morpholinophenyl)-butanone-1)
- Initiator . . . 0.3 part by weight
  (4,4'-diethylaminobenzophenone)
- Initiator . . . 0.1 part by weight
  (2,4-diethylthioxanthone)
- Solvent . . . 75.8 parts by weight
  (ethylene glycol monobutyl ether)

(Photoresist for Red (R) Color Pixels)
- Red pigment . . . 5.0 parts by weight
  (C. I. PR254 (manufactured by Ciba Specialty Chemical Co., Ltd., Chromophthal DPP Red BP))
- Yellow pigment . . . 1.0 part by weight
  (C. I. PY139 (manufactured by BASF Co., Ltd., Pariotol Yellow D1819))
- Dispersant . . . 3.0 parts by weight
  (Zeneca Co., Ltd., Solsperse 24000)
- Monomer . . . 4.0 parts by weight
  (manufactured by Sartomer Co., SR399)
- Polymer 1 . . . 5.0 parts by weight
- Initiator . . . 1.4 part by weight
  (manufactured by Ciba Geigy Co., Ltd., Irgacure 907)
- Initiator . . . 0.6 part by weight
  (2,2'-bis(o-chlorophenyl)-4,5,4',5'-tetraphenyl-1,2'-biimidazole)
- Solvent . . . 80.0 parts by weight
  (propylene glycol monomethyl ether acetate)

(Photoresist for Green (G) Color Pixels)
- Green pigment . . . 3.8 parts by weight
  (C. I. PG7 (manufactured by Obi Shoka Kogyo KK, Seika Fast Green 5316P))
- Yellow pigment . . . 2.2 parts by weight
  (C. I. PY139 (manufactured by BASF Co., Ltd., Pariotol Yellow D1819))
- Dispersant . . . 3.0 parts by weight
  (manufactured by Zeneca Co., Ltd., Solsperse 24000)
- Monomer . . . 4.0 parts by weight
  (manufactured by Sartomer Co., SR399)
- Polymer 1 . . . 5.0 parts by weight
- Initiator . . . 1.4 part by weight
  (manufactured by Ciba Geigy Co., Ltd., Irgacure 907)
- Initiator . . . 0.6 part by weight
  (2,2'-bis(o-chlorophenyl)-4,5,4',5'-tetraphenyl-1,2'-biimidazole)
- Solvent . . . 80.0 parts by weight
  (propylene glycol monomethyl ether acetate)

(Photoresist for Blue (B) Color Pixels)
- Blue pigment . . . 4.6 parts by weight
  (C. I. PB15:6 (manufactured by BASF Co., Ltd., Periogen Blue L6700F))
- Violet pigment . . . 1.4 part by weight
  (C. I. PV23 (manufactured by Clariant Co., Ltd., Foster Perm RL-NF))
- Pigment Derivative . . . 0.6 part by weight
  (manufactured by Zeneca Co., Ltd., Solsperse 12000)
- Dispersant . . . 2.4 parts by weight
  (manufactured by Zeneca Co., Ltd., Solsperse 24000)
- Monomer . . . 4.0 parts by weight
  (manufactured by Sartomer Co., SR399)
- Polymer 1 . . . 5.0 parts by weight
- Initiator . . . 1.4 part by weight
  (manufactured by Ciba Geigy Co., Ltd., Irgacure 907)
- Initiator . . . 0.6 part by weight
  (2,2'-bis(o-chlorophenyl)-4,5,4',5'-tetraphenyl-1,2'-biimidazole)
- Solvent . . . 80.0 parts by weight
  (propylene glycol monomethyl ether acetate)

(Photoresist for Columns (CS))
- Monomer . . . 9.0 parts by weight
  (manufactured by Sartomer Co., SR399)
- Polymer 1 . . . 8.0 parts by weight
- Initiator . . . 2.0 parts by weight
  (manufactured by Ciba Geigy Co., Ltd., Irgacure 907)
- Initiator . . . 1.0 part by weight
  (manufactured by Ciba Geigy Co., Ltd., Irgacure 365)
- Solvent . . . 80.0 parts by weight
  (propylene glycol monomethyl ether acetate)

The aforementioned polymer 1 is prepared by adding 16.9 mol % 2-methacryloyl oxyethyl isocyanate to 100 mol. % copolymer of benzyl methacrylate:styrene:acrylic acid:2-hydroxyethyl methacrylate=15.6:37.0:30.5:16.9 (molar ratio), with its average molecular weight being 42500.

Formation of Color Layer

A borosilicate glass substrate (manufactured by Corning Co., Ltd., "1737 material") was prepared as a substrate subjected to washing treatment, a coloration material dispersion was coated for each color in the below-described manner on the upper surface of the borosilicate glass substrate and color layers were laminated on the substrate.

First, the photoresist for BM prepared as described above was coated by a spin coating method on the glass substrate and pre-baked for 3 min at a temperature of 90° C. Then, exposure (100 mJ/cm$^2$) was conducted by using a mask formed according to the predetermined pattern, and then spray development using a 0.05% aqueous solution of KOH was performed for 60 sec. Then, post-baking was conducted for 30 min at 200° C. and a BM substrate having a BM formed thereon to a thickness of 1.2 μm was produced.

Then, the pigment dispersion-type photoresist of red color (R) that was prepared for reflective display sections was coated by a spin coating method on the BM substrate, and pre-baked for 3 min at 80° C. Then, UV radiation exposure (200 mJ/cm$^2$) was conducted by using a photomask for a predetermined color pattern corresponding to the pattern of the reflective display sections. Then, spray development using a 0.1% aqueous solution of KOH was performed for 60 sec, followed by post-baking for 30 min at 200° C. As a result, a pattern of reflective display sections in the red (R) color pixels with a film thickness of 1.2 μm was formed in the predetermined positions corresponding to the BM pattern.

The pigment dispersion-type photoresist of red (R) color prepared for the transmissive display sections was then coated by a method similar to the method for forming the pattern of reflective display sections in the red (R) color pixels and a pattern of transmissive display sections was formed.

Then, patterns of reflective display sections and transmissive display sections were formed for green (G) color pixels and blue (B) color pixels by using the method similar to the method for forming the patterns of reflective display sections and transmissive display sections in the red (R) color pixels.

A substrate was thus obtained in which a color layer composed of BM, red color pixels, green color pixels, and blue color pixels was thus formed on the glass substrate, and this color layer was formed to obtain dot number 160×(120×3 (RGB)), pixel size 240 μm×(80×3 (RGB)) μm, and aperture size of transmissive display sections 70 μm×40 μm. The (RGB) above indicates the same for each color pixel. For example, the number of dots was 160×120 for each color pixel of RGB.

Substrate Preparation

A substrate was prepared by fabricating an oriented film as a functional layer of the above-described substrate having the color filter disposed thereon.

The oriented film with a thickness of 700 Å was fabricated by using AL1254 manufactured by JSR Co., Ltd. as a film composition liquid for constituting the oriented film and coating the film composition liquid on the substrate surface by flexo printing.

Preparation of Liquid Crystal Composition

A liquid crystal composition was prepared by using RMM 34 (manufactured by Merck Co., Ltd.), which is a polymerizable liquid crystal demonstrating a nematic liquid crystal phase, as the liquid crystal constituting the fixed liquid crystal layer, and mixing 25 parts by weight of the liquid crystal, 1 part by weight of a photopolymerization initiator (manufactured by Ciba Co., Ltd., "Irgacure 907"), and 74 parts by weight of toluene as a solvent.

Coating of Liquid Crystal Composition

The substrate was disposed in a spin coater (manufactured by MIKASA Co., Ltd., trade name 1H-360S), and the liquid crystal composition was spin coated on the oriented film, thereby coating the liquid crystal composition on the oriented film formed on the substrate and producing a coated film.

Formation of Liquid Crystal Phase

The substrate having the coated film formed thereon was heated for 5 min at 100° C. by using a hot plate, the solvent remaining in the coated film was almost completely removed, and the liquid crystal contained in the coated film was set to a state of a liquid crystal phase.

Formation of Liquid Crystal Phase Sections

A photomask patterned in advance so that the liquid crystal phase formation sections and isotropic phase formation sections of the coated film matched the light reflecting sections and light transmitting sections on the respective color filters was disposed so that the light transmitting sections corresponded to the liquid crystal phase formation sections and that the light shielding sections corresponded to the isotropic phase formation sections. Then, the coated film was exposed at an exposure dose of 600 mJ/cm$^2$ via a photomask by using ultraviolet radiation with a wavelength of 365 nm, the liquid crystal contained in the liquid crystal formation sections was crosslinked and polymerized and liquid crystal phase sections were formed.

Formation of Isotropic Phase Sections

After the liquid crystal phase sections have been formed, the substrate having the coated film laminated thereon was heated for 60 min at 200° C., the liquid crystal contained in the zones (isotropic phase formation sections) of the coated film where the liquid crystal phase sections have not been formed was converted to an isotropic phase, the liquid crystal was crosslinked and polymerized to form the isotropic phase sections, and an optical element was obtained.

The protrusion height of the liquid crystal phase sections of the optical element was measured in the below-described manner with respect to the optical element thus obtained.

Measurement of Protrusion Height of Liquid Crystal Phase Sections

A probe-type step height meter (manufactured by Nippon Shinku Gijutsu KK, DEKTAK FPD-650) was used, the measurement distance (step height) was set to a sequence of isotropic phase section—liquid crystal phase section—isotropic phase section, and the protrusion height of liquid crystal phase section was measured for the isotropic phase section and liquid crystal phase section under a load of 5 mg for a measurement time of 20 sec. The results are shown in Table 1.

Whether or not the orientation characteristic is good was judged in the following manner with respect to the optical element obtained.

Polarization plates were disposed to obtain a cross Nicol's configuration, the optical element was disposed between the two polarization plates, one polarization plate was irradiated with light, and the state of the transmitted light from the other polarization plate was observed by using a polarization microscope, while rotating the optical element. In the observations, whether or not a completely black state (dark state) was formed when the orientation axis of the optical element matched the transmission axis of any polarization plate, and whether or not the isotropic phase sections assumed a black state and a white state (bright state) was formed only in the liquid crystal phase sections when the optical element was disposed so that the orientation axis of the optical element was inclined at an angle of 45° with respect to the transmission axis of the polarization plate was judged by observations.

Measurement of Phase Difference of Liquid Crystal Phase Sections

A phase difference of liquid crystal phase sections on the substrate was measured with respect to the obtained optical element by using RETS-1250VA manufactured by Otsuke Electronics Co., Ltd. The measurements were carried out by shielding the isotropic phase sections by placing a mask that was patterned correspondingly to the formation pattern of isotropic phase sections on the optical element.

A semi-transmissive semi-reflective liquid crystal display device was then fabricated by using the optical element obtained in the above-described manner, and suitability of the optical element for the semi-transmissive semi-reflective liquid crystal display device was evaluated by measuring the transmission factor and reflection factor thereof.

First, the optical element obtained in the above-described manner was used and processing for incorporating the optical element into the liquid crystal display device was conducted as described below.

Formation of Columns

The prepared photoresist for columns (CS) was coated on the optical element by a spin coating method and pre-baked for 3 min at 80° C. Exposure with ultraviolet radiation (200 mJ/cm$^2$) was then conducted by using a predetermined photomask for columns corresponding to the BM pattern. Then, spray development using a 0.1% aqueous solution of KOH was carried out for 60 sec, followed by post-baking for 30 min at 230° C. As a result, a columnar pattern with a height of 3.2 μm was formed in the prescribed positions with respect to the BM pattern.

ITO Film

ITO, which is a transparent electrode material, was formed to a film thickness of about 1500 Å by a conventional sputtering method on the color filter for semi-transmissive semi-reflective display provided with a phase difference function and having columns disposed thereon.

Formation of Oriented Film

A polyimide (Nissan Chemicals Co., Ltd., SE-7511) film was then coated on the entire surface to form an oriented film and rubbing was conducted.

The optical element subjected to such processing was used as a color filter.

An array substrate in which a multiplicity of TFT were arranged according to a pattern corresponding to the formation pattern of color pixels in the color layer formed on the optical element was then fabricated in the following manner.

Fabrication of Array Substrate

An alkali-free glass substrate (manufactured by Corning Co., Ltd., "7059 material") was prepared as a substrate subjected to washing and gate electrodes were formed thereon by forming a coating film from aluminum. In this process, the gate electrodes were patterned by using a mask formed so as to ensure the correspondence to the formation pattern of color pixels.

Then, a gate insulating film such as a silicon nitride film was formed to a film thickness of 100 to 200 nm by a plasma CVD method on the substrate surface where the gate electrodes have been formed, and an amorphous silicon film with a thickness of 80 nm was formed on the gate insulating film.

The substrate surface where the amorphous silicon film has been formed was patterned by using a mask formed so as to ensure the correspondence to the formation pattern of color pixels, and the amorphous silicon region was patterned. Further, a silicon nitride film was formed on the entire substrate surface where the amorphous silicon film has been formed, this silicon nitride film was patterned by using a mask by the same process as was used in the preparation of the amorphous silicon film, and an etching stopper was formed.

A N+ layer was then formed by injecting phosphorus ions into the amorphous silicon film by an ion doping method at a dose of about 5×10$^{15}$ ions/cm$^2$.

An interlayer insulating film was then formed on the substrate surface where the N+ layer has been formed by spin coating a photosensitive organic resin such as an acrylic resin on the substrate surface to a thickness of about 2 μm.

Light transmitting sections were then provided by forming openings in the silicon nitride film that formed the gate insulating film and the acrylic resin layer that formed the interlayer insulating film and contact holes were provided for connecting the pixel electrodes and TFT formation sections.

An Al (aluminum) metal film was then formed to a film thickness of about 100 nm by a sputtering method. Then, light reflecting sections were formed by patterning so as to obtain a pattern corresponding to the formation pattern of the reflective display sections of the optical element. A film of ITO (indium tin oxide), which is a transparent conductive material, was then formed by a sputtering method to a thickness of about 150 nm, and then pixel electrodes were formed by patterning conducted so as to obtain a pattern corresponding to the formation pattern of the color layer of the optical element. A publicly known method was used for sputtering in the formation of the above-described thin metal film and pixel electrodes.

An oriented film was then formed by forming a film of polyimide or the like on the entire surface of the substrate where the pixel electrodes and the like have been formed, and then rubbing was conducted at an angle of 90° with respect to the rubbing direction of the color filter.

An array substrate was obtained by such a process.

Fabrication of Liquid Crystal Display Device

A TN liquid crystal (manufactured by Merck Co., Ltd., ZLI-4792, Δn=0.088) was dropped in an amount of about 15 mL as a drive liquid crystal on the glass substrate (array substrate) where the TFTs have been formed, the color filters obtained in the above-described manner were placed to sandwich the TN liquid crystal, a UV-curable resin was used as a sealing material so as to prevent the TN liquid crystal from leaking to the outside, the array substrate and color filters were joined by exposing to a radiation dose of 400 mJ/cm$^2$, while applying a pressure of 0.3 kg/cm$^2$ at normal temperature, and a cell was formed in which a liquid layer was formed between the array substrate and color filter. Two polarization plates were disposed so that the transmission axes thereof matched the rubbing directions of respective color filter substrates and array substrates on the outer surfaces of the two array substrates and color filters in the cell.

A liquid crystal display device (cell gap: 3.1 μm in the transmissive display sections and 1.6 μm in the reflective display sections) using the optical element obtained in accordance with the present invention was thus fabricated.

Measurement of Transmission Factor and Reflection Factor

Figure 8:
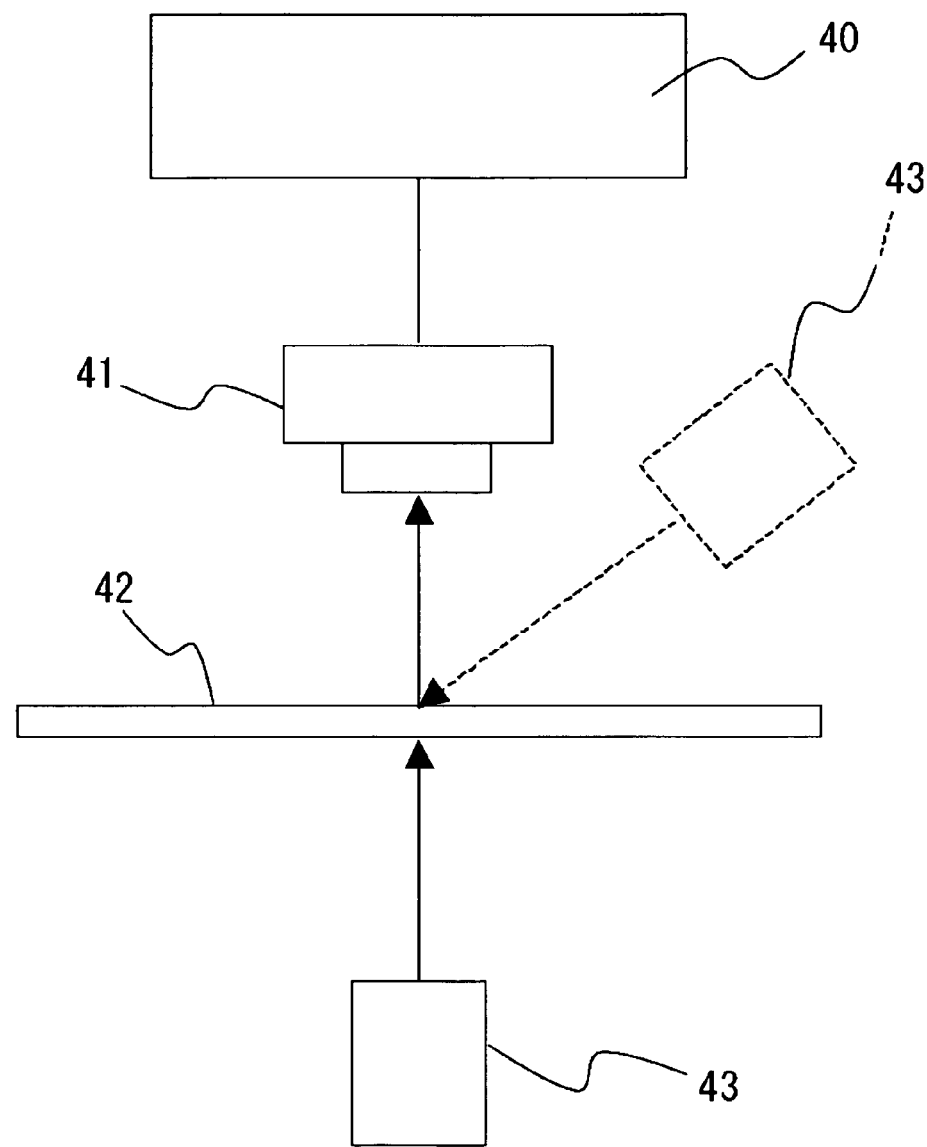
FIG. 8 is a schematic view illustrating a method for measuring a transmission ratio and reflection ratio of the liquid crystal display device.

The transmission factor and reflection factor of the liquid crystal display device using the optical element in accordance with the present invention were measured by using the device shown in FIG. 8.

This device comprised a measurement device 40 for measuring a light quantity and a photosensor 41 connected to this measurement device 40. The liquid crystal display device 42 was disposed so as to face the photosensor 41 in the vertical direction. A light source 43 was provided to enable the irradiation of the liquid crystal display device 42 with light.

The light source 43 was disposed below the liquid crystal display device 42, the light fell from the light source 43 on the liquid crystal display device, the quantity of light transmitted through the liquid crystal display device 42 (transmitted light quantity) was measured, and the transmission factor of the liquid crystal display device 42 was calculated as a value obtained by dividing the transmitted light quantity by the incident light quantity.

Then, the light source 43 was disposed in the direction inclined at an angle of 2° to the vertical direction, the light was introduced from the light source 43 into the liquid crystal display device 42, the light quantity of the reflected light (reflected light quantity) was measured, and the reflection factor of the liquid crystal display device 42 was calculated as a value obtained by dividing the reflected light quantity and the incident light quantity. The results are shown in Table 1.

Example 2

An optical element was obtained in the same manner as in Example 1, except that the exposure dose during formation of the liquid crystal phase sections was 400 mJ/cm². The liquid crystal phase section protrusion height of the liquid crystal phase sections and isotropic phase sections in the optical element thus obtained was as shown in Table 1. A liquid crystal display device was then fabricated in the same manner as in Example 1, except that the height of columns during processing conducted to form the color filters by using the optical element thus obtained, was 2.2 µm, and the TN liquid crystal used for forming the cell was ZLI-2293 ($\Delta n=0.1332$) manufactured by Merck Co., Ltd. The transmission factor and reflection factor of the liquid crystal display device were measured. The results are shown in Table 1.

Comparative Example 1

An optical element was obtained in the same manner as in Example 1, except that isotropic phase sections were not formed and the formation of the liquid crystal phase sections was carried out in the manner as follows. Thus, the liquid crystal phase sections were formed by performing mask exposure at an exposure dose of 100 mJ/cm², developing and removing the zones other than the liquid crystal phase sections (non-exposed zones), and then heating the substrate for 60 min at 200° C. The film thickness of the liquid crystal phase sections was 1.6 µm. This film thickness of 1.6 µm is described in the column of liquid crystal phase section protrusion height in Table 1.

A liquid crystal display device was fabricated in the same manner as in Example 1 by using this optical element, and the transmission factor and reflection factor of the liquid crystal display device were measured. The results are shown in Table 1.

As shown in Table 1, in accordance with the present invention, an optical element having an adequate step can be obtained by regulating the exposure dose when liquid crystal phase sections are fabricated according to Δn of drive liquid crystals. Furthermore, a liquid crystal display device fabricated by using the optical element obtained in accordance with the present invention maintains the transmission factor and reflection factor at the same level as that of the liquid crystal display device fabricated by the conventional method that requires the development process. Therefore, in accordance with the present invention, an optical element can be obtained in an easy matter and a liquid crystal display device on par with the conventional devices can be obtained easier than by the conventional method.

What is claimed is:

1. An optical element comprising: a substrate having a light transmission ability; and a fixed liquid crystal layer formed on the substrate, wherein the fixed liquid crystal layer comprises:

liquid crystal phase sections in which a liquid crystalline compound is fixed in a liquid crystal phase state; and isotropic phase sections in which a liquid crystalline compound is fixed in an isotropic phase state, and a layer thickness of the liquid crystal phase sections is larger than the layer thickness of the isotropic phase sections.

2. The optical element according to claim 1, wherein the liquid crystal phase sections and isotropic phase sections are provided adjacently to each other.

3. The optical element according to claim 1, wherein a plurality of the liquid crystal phase sections and isotropic phase sections are formed with a prescribed pattern.

4. The optical element according to claim 1, wherein the liquid crystal phase sections have a phase difference of λ/4.

5. The optical element according to claim 1, wherein the liquid crystalline compound is a thermotropic liquid crystal polymerizable under ultraviolet radiation.

6. The optical element according to claim 1, wherein a layer constituting a switching circuit is laminated on the substrate.

7. The optical element according to claim 1, wherein a plurality of light reflecting sections are provided with a predetermined pattern on the substrate and the liquid crystal phase section is provided on each light reflecting section.

8. The optical element according to claim 1, wherein a color layer is formed on the substrate.

9. The optical element according to claim 8, wherein the liquid crystal phase sections and isotropic phase sections are formed on the substrate via the color layer.

TABLE 1

|  |  | Exposure dose | Liquid crystal phase section protrusion height | Transmission factor | Reflection factor |
| --- | --- | --- | --- | --- | --- |
| Example 1 | Method of the present invention | 600 mJ/cm² | 1.6 µm | 6.8% | 30% |
| Example 2 | Method of the present invention | 400 mJ/cm² | 1.0 µm | 6.7% | 30% |
| Comparative Example 1 | Conventional method | 100 mJ/cm² | 1.6 µm | 6.7% | 29% |

10. The optical element according to claim 1, wherein an oriented film is provided on the substrate, and the fixed liquid crystal layer is provided on the substrate via the oriented film.

11. A method for manufacturing an optical element comprising:
   a coated film formation step of forming a coated film by coating a liquid crystal composition comprising a liquid crystalline compound on a substrate;
   a liquid crystal phase formation step of orienting the liquid crystalline compound in the coated film in the state of liquid crystal phase;
   a liquid crystal phase section formation step of irradiating the liquid crystalline compound that has been oriented in the state of a liquid crystal phase with light, and selectively forming the fixed liquid crystal phase section in which the liquid crystalline compound is polymerized and fixed in a liquid crystal phase state; and
   an isotropic phase section formation step of fixing the liquid crystalline compound that has not been fixed in the liquid crystal phase section formation step in an isotropic phase state and forming the isotropic phase section.

12. The method for manufacturing an optical element according to claim 11, wherein ultraviolet radiation is used as the light for irradiating the liquid crystalline compound.

13. The method for manufacturing an optical element according to claim 11, wherein, in the isotropic phase section formation step, the liquid crystalline compound is polymerized and fixed in a state of isotropic phase by heating to an isotropic phase transition temperature or to a higher temperature and performing irradiation with ultraviolet radiation.

14. The method for manufacturing an optical element according to claim 11, wherein a liquid crystal phase section protrusion height indicating a difference between a layer thickness of the liquid crystal phase sections and a layer thickness of the isotropic phase sections is controlled by regulating an irradiation dose of light in the liquid crystal phase section formation step.

15. A semi-transmissive semi-reflective liquid crystal display device comprising:
   laminated members comprising a substrate and a material layer other than the substrate;
   a drive liquid crystal layer formed between two laminated members arranged opposite each other;
   a plurality of light reflecting sections formed with a predetermined pattern at any one laminated member from among the two laminated members, and a plurality of light transmitting sections formed adjacently to the light reflecting sections;
   reflective display regions where light is reflected by the light reflecting regions;
   transmissive display regions where light is transmitted by the light transmitting regions;
   and an optical element included in any one laminated member from among the two laminated members, wherein
   the optical element has a substrate having a light transmission ability and a plurality of liquid crystal phase sections and isotropic phase sections formed according to a predetermined pattern on the substrate, and the layer thickness of the liquid crystal phase sections is larger than the layer thickness of the isotropic phase sections, and
   the liquid crystal phase sections of the optical element are provided in positions corresponding to the reflective display regions and the isotropic phase sections are provided in the positions corresponding to the transmissive display regions.

16. The semi-transmissive semi-reflective liquid crystal display device according to claim 15, that has a liquid crystal phase section protrusion height that is necessary to generate a $\lambda/4$ phase difference between light passing through transmissive display regions and light passing through reflective display regions in a drive liquid crystal layer as a liquid crystal phase section protrusion height indicating a difference between a layer thickness of liquid crystal phase sections and a layer thickness of isotropic phase sections.

* * * * *

UNITED STATES PATENT AND TRADEMARK OFFICE
CERTIFICATE OF CORRECTION

PATENT NO. : 7,652,744 B2 Page 1 of 1
APPLICATION NO. : 11/588283
DATED : January 26, 2010
INVENTOR(S) : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Twenty-eighth Day of December, 2010

David J. Kappos
*Director of the United States Patent and Trademark Office*